(12) United States Patent
Cheng

(10) Patent No.: US 12,246,405 B2
(45) Date of Patent: Mar. 11, 2025

(54) METHOD FOR REPAIRING RAIL WHEELS

(71) Applicant: Paul Po Cheng, London (CA)

(72) Inventor: Paul Po Cheng, London (CA)

( * ) Notice: Subject to any disclaimer, the term of this patent is extended or adjusted under 35 U.S.C. 154(b) by 0 days.

(21) Appl. No.: 18/569,052

(22) PCT Filed: Jun. 20, 2022

(86) PCT No.: PCT/CA2022/050985
§ 371 (c)(1),
(2) Date: Dec. 11, 2023

(87) PCT Pub. No.: WO2022/266750
PCT Pub. Date: Dec. 29, 2022

(65) Prior Publication Data
US 2024/0278361 A1    Aug. 22, 2024

Related U.S. Application Data

(60) Provisional application No. 63/212,745, filed on Jun. 21, 2021.

(51) Int. Cl.
*B23P 6/04* (2006.01)
*B61K 11/00* (2006.01)

(52) U.S. Cl.
CPC .............. *B23P 6/04* (2013.01); *B61K 11/00* (2013.01)

(58) Field of Classification Search
CPC ..................................... B23P 6/04; B23P 6/00
See application file for complete search history.

(56) References Cited

U.S. PATENT DOCUMENTS 4,458,125 A  * 7/1984 Leis ..................... C21D 9/04
                                                   219/676
4,680,846 A    7/1987 Feldewert
(Continued)

FOREIGN PATENT DOCUMENTS

| EP | 3147070 A1 | 3/2017 | |
| FR | 2631268 A1 * | 11/1989 | ............. F01D 5/005 |
| RU | 2487001 C1 | 7/2013 | |

OTHER PUBLICATIONS

English Machine Translation of FR-2631268-A1 (Year: 1989).*
International Search report for the corresponding International Application PCT/CA2022/050985 dated Sep. 21, 2022.

*Primary Examiner* — Sarang Afzali

(57) ABSTRACT

A method of repairing a rail wheel including removing a selected segment of a rim of the rail wheel to provide a remaining segment having a first engagement surface, and providing a replacement workpiece including a replacement body element having a second engagement surface formed to mate with the first engagement surface. The replacement workpiece is positioned to define a predetermined gap between the first and second engagement surfaces. One or more heating elements are positioned in the predetermined gap, for induction heating, in a non-oxidizing atmosphere, of first and second heated portions of the remaining segment and the replacement workpiece, and the first and second engagement surfaces, to a hot working temperature, for plastic deformation thereof. The heating elements are removed, and the first and second engagement surfaces are engaged for plastic deformation of at least part of the first and second heated portions and the engagement surfaces.

16 Claims, 18 Drawing Sheets

(56) References Cited

U.S. PATENT DOCUMENTS

| | | | |
|---|---|---|---|
| 4,864,706 A * | 9/1989 | Jenkel | F01D 5/3061 |
| | | | 228/160 |
| 4,883,216 A * | 11/1989 | Patsfall | F01D 5/005 |
| | | | 228/119 |
| 8,177,115 B1 | 5/2012 | Mercier | |
| 9,434,019 B2 * | 9/2016 | Keefe | B23P 6/00 |
| 2010/0064515 A1 * | 3/2010 | Eichmann | B23K 13/015 |
| | | | 29/889.1 |

* cited by examiner

METHOD FOR REPAIRING RAIL WHEELS

CROSS-REFERENCE TO RELATED APPLICATION

This application claims priority from U.S. Provisional Patent Application No. 63/212,745, filed on Jun. 21, 2021, the entire disclosure whereof is hereby incorporated by reference herein.

FIELD OF THE INVENTION

The present invention is a method and a system for repairing rail wheels.

BACKGROUND OF THE INVENTION

As is well known in the art, trains, trams, and overhead cranes typically include rail wheels that are formed to engage rails. A typical rail wheel set 10 is illustrated in FIG. 1, in which rail wheels 12A, 12B thereof engage rails 14A, 14B. The rail wheels 12A, 12B rotate about an axis "X" defined by an axle 16 that extends between the rail wheels 12A, 12B. It will be understood that the axle 16 is mounted to a carriage or frame of a railway car that is omitted from FIG. 1, to simplify the illustration. Typically, the rail wheels are made of steel, and may be cast (i.e., machined from a single casting) or forged (i.e., forged and rolled).

Portions of a typical rail wheel 12 are illustrated in FIGS. 2A and 2B. As can be seen in FIGS. 2A and 2B, the wheel 12 preferably includes a web 18 located between a hub 19 that includes a boss 20 defining a bore 22 in which the axle 16 (not shown in FIG. 2A or 2B) is receivable, and a rim portion 24. The rim portion 24 includes a tread 26 and a flange 28, for engaging the rail (not shown in FIGS. 2A, 2B).

As can be seen in FIG. 2B, the tread 26 and the flange 28 have profiles (generally identified by reference character 30 in FIG. 2B) that conform to a predetermined design, when the wheel 12 is first manufactured. Over time, the tread 26 and the flange 28 become worn, and no longer conform to the design. An example of a typical profile of the worn tread 26 and the worn flange 28 is identified in FIG. 2B by reference character 32.

In the prior art, there have been attempts to repair worn tread or a worn flange, e.g., by welding additional material 33 (typically, steel) to a substrate 34 of the hub 19 over the worn profile 32, to replace the material that has been worn away from the tread 26 and from the flange 28. An example is shown in FIG. 2B, in which the replacement material 33 has a profile 30' that is the same, or substantially the same, as the profile 30 of the tread 26 and the flange 28 as originally manufactured that is illustrated in FIG. 2A.

However, these prior art repair methods have generally been unsatisfactory because the replacement material 33 tends to fall off or otherwise separate from the substrate 34. It is believed that the failure of the replacement material is generally due to a heat-affected zone "HAZ" in the substrate and in the replacement material that is created when the replacement material is welded, using conventional methods, to the substrate 34.

Another conventional repair method involves milling or cutting out the worn metal to form a new tread and a new flange at a smaller radius than the original tread and flange. However, this procedure typically may only be used two or three times with a particular rail wheel due to insufficient metal remaining, at which point the rail wheel may be recycled.

SUMMARY OF THE INVENTION

For the foregoing reasons, there is a need for a method and a system that overcomes or mitigates one or more of the defects or deficiencies of the prior art.

In its broad aspect, the invention provides a method of repairing a worn rail wheel in which a selected segment of the worn rail wheel is removed, to provide a remaining segment of a rim of the rail wheel having a first engagement surface. A replacement workpiece is provided having a replacement body element and a second engagement surface that is formed to mate with the first engagement surface. The replacement workpiece is positioned to define a predetermined gap between the first and second engagement surfaces. One or more heating elements are positioned in the predetermined gap, for induction heating of first and second heated portions of the remaining segment and the replacement workpiece and the first and second engagement surfaces, in a non-oxidizing atmosphere, to a hot working temperature.

Once the first and second heated portions and the first and second engagement surfaces are heated to the hot working temperature, the heating elements are removed, and the first and second engagement surfaces are engaged, while at least one of the first and second engagement surfaces is in motion relative to the other, for plastic deformation of at least part of the first and second heated portions and the first and second engagement surfaces. The first and second engagement surfaces and the first and second heated portions are allowed to cool, to bond the replacement workpiece and the remaining segment together.

BRIEF DESCRIPTION OF THE DRAWINGS

The invention will be better understood with reference to the attached drawings, in which.

DETAILED DESCRIPTION

Figure 1:
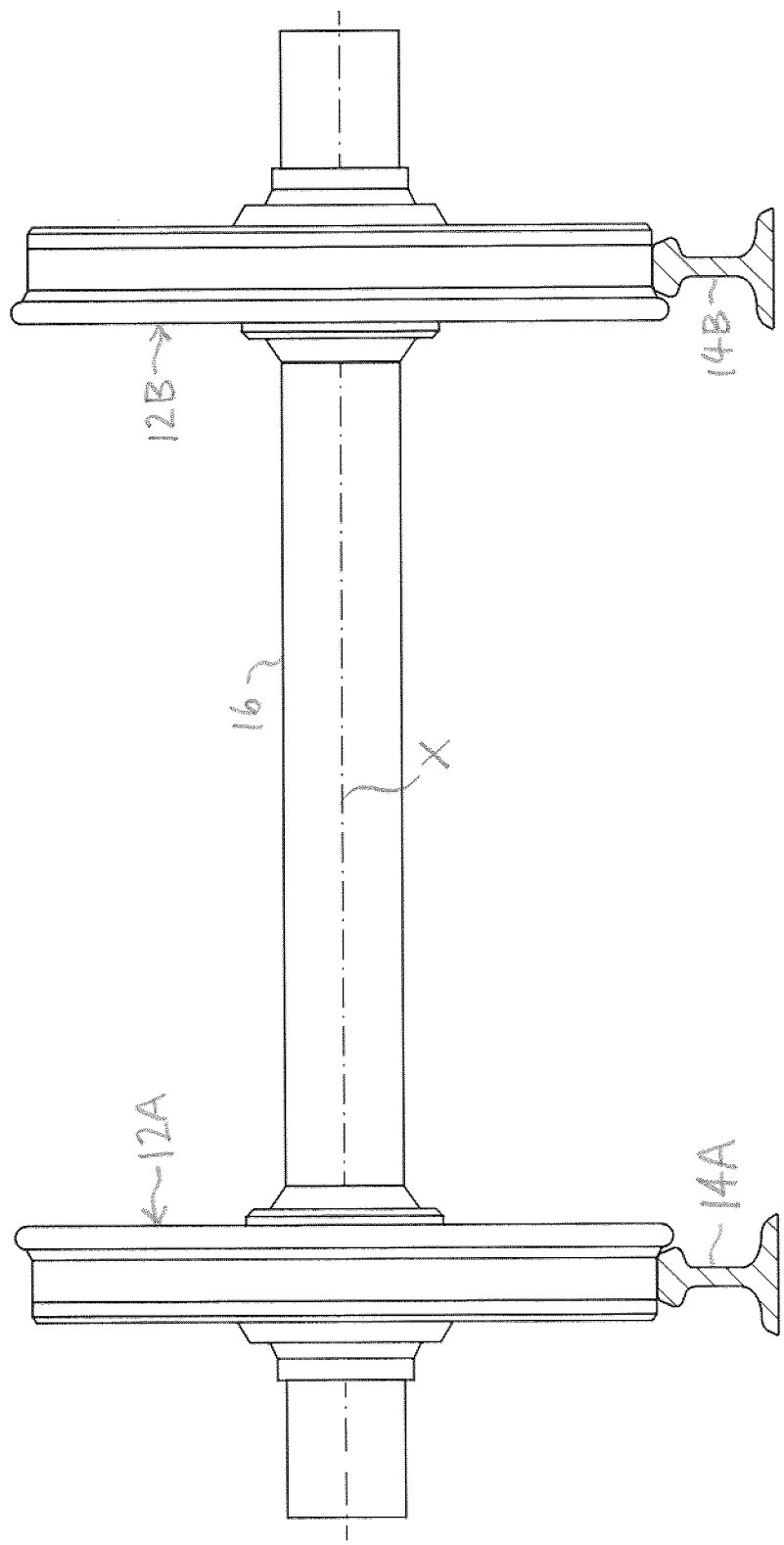
FIG. 1 (also described previously) is a side view of a rail wheel set of the prior art.
Figure 2B:
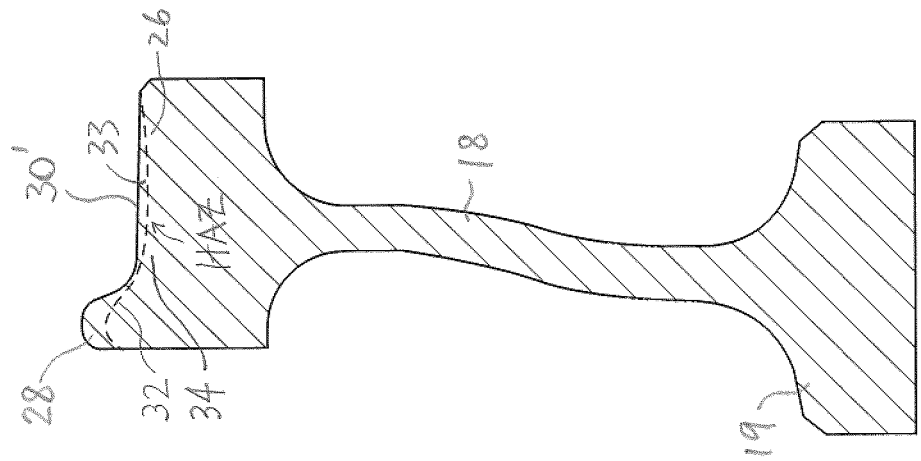
FIG. 2B (also described previously) is a cross-section of a portion of the prior art rail wheel of FIG. 2A, drawn at a larger scale.
Figure 2A:
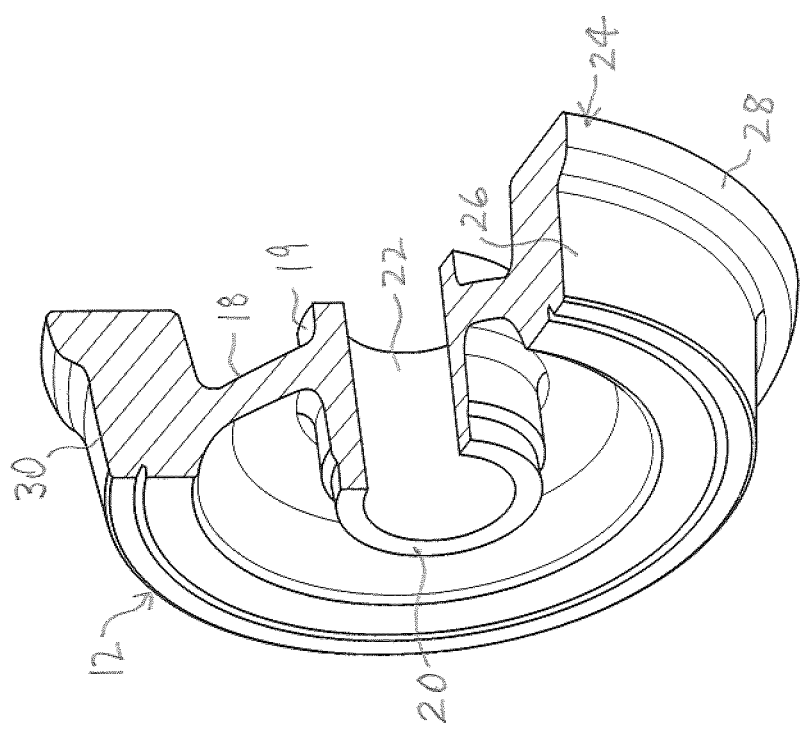
FIG. 2A (also described previously) is a partially cut away isometric view of a rail wheel of the prior art.

In the attached drawings, like reference numerals designate corresponding elements throughout. In particular, to simplify the description, the reference numerals previously used in FIGS. 1-2B are used again in connection with the description of the invention hereinafter, except that each such reference numeral is raised by 100 (or by whole number multiples thereof, as the case may be), where the elements describe correspond to the elements of the prior art illustrated in FIGS. 1-2B. Reference is first made to FIGS. 3A-3G to describe an embodiment of a method in accordance with the invention.

Figure 3A:
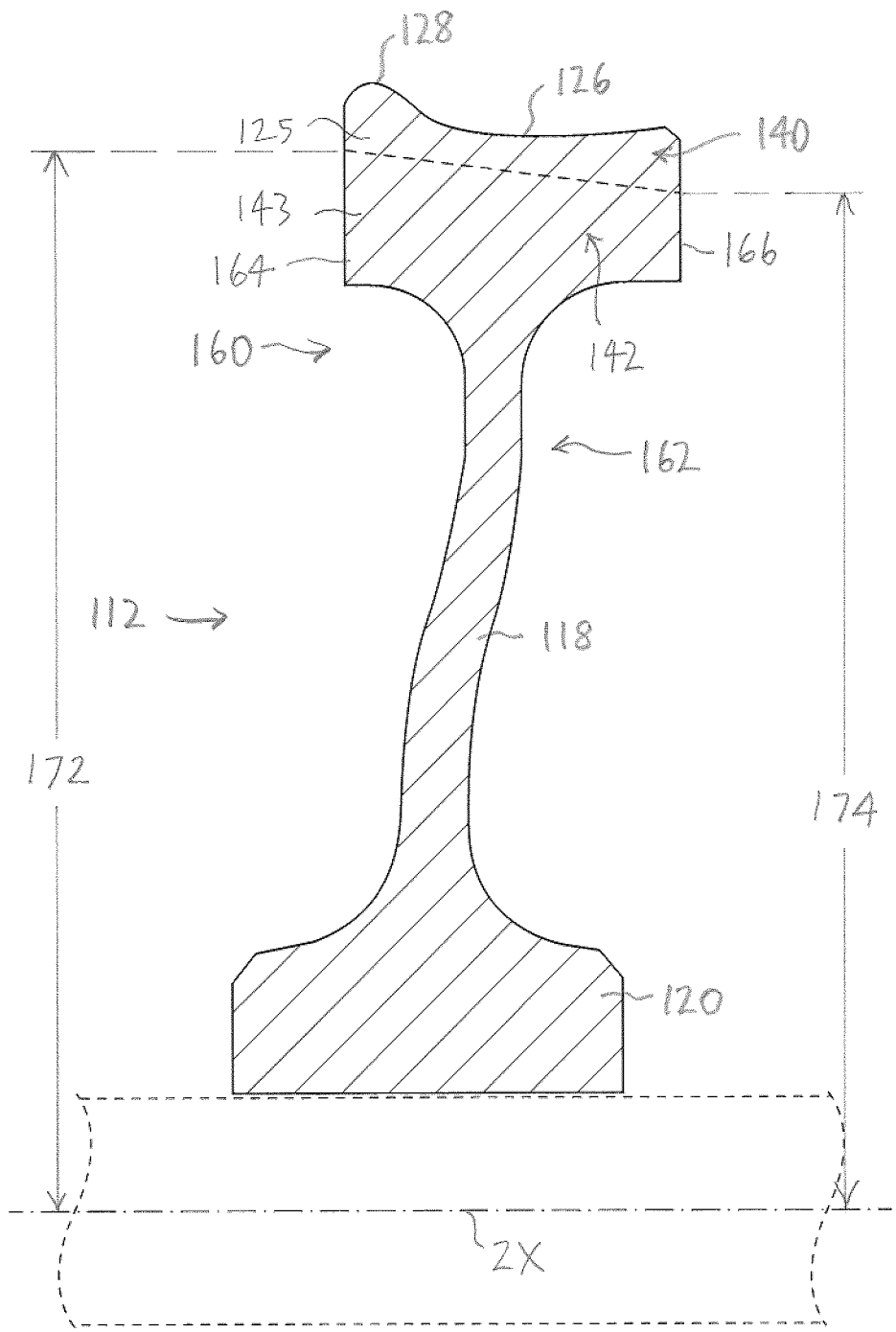
FIG. 3A is a cross-section of a portion of a worn rail wheel to be repaired, drawn at a larger scale.

The method is for repairing a rail wheel 112 having a rim 124 including a worn body element 125 and a worn tread 126 and a worn flange 128 thereon formed for engagement with a rail (not shown in FIGS. 3A-3F). An example of a worn rail wheel 112 that is to be repaired is illustrated in FIG. 3A. It will be understood that only a portion of the worn rail wheel 112 is illustrated in FIG. 3A, for clarity of illustration. As can be seen in FIG. 3A, the rail wheel 112 includes a boss 120 defining an axis "2X" thereof in which an axle 116 is receivable, and a web 118 connecting the rim 124 and the boss 120 together.

Figure 3B:
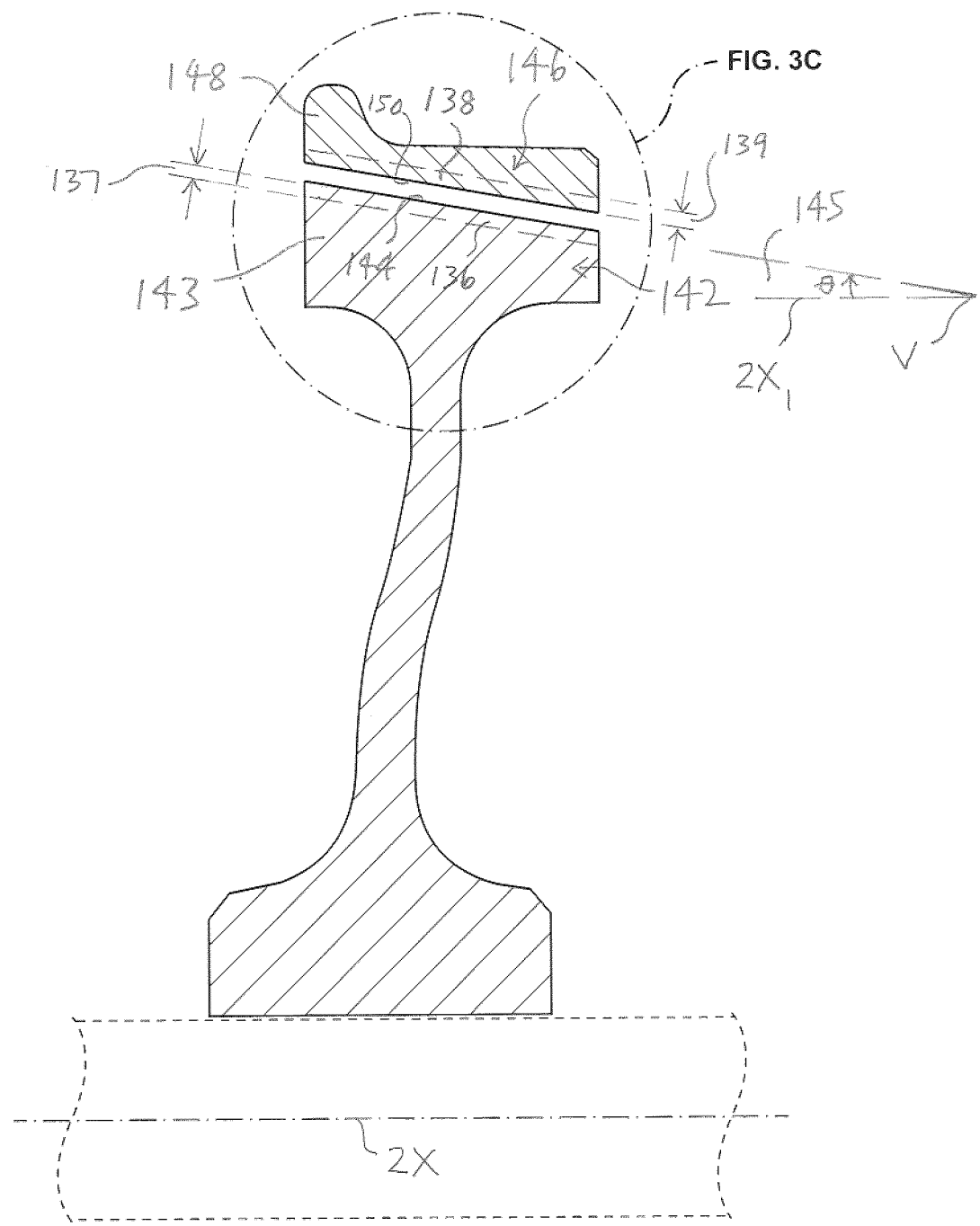
FIG. 3B is a cross-section of a remaining segment of the rail wheel of FIG. 2C with an embodiment of a replacement workpiece located to define a predetermined gap therebetween.
Figure 3C:
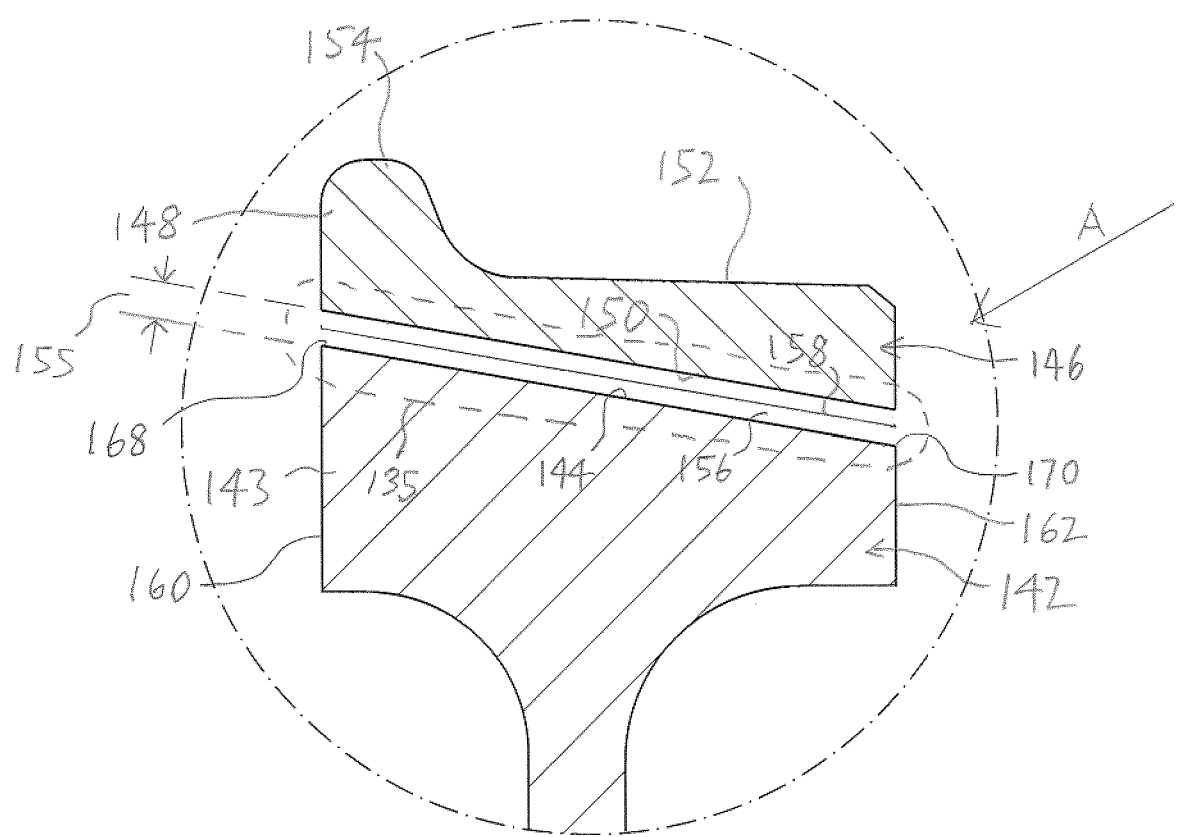
FIG. 3C is a part of the cross-section of FIG. 3B, drawn at a larger scale.

Preferably, the method includes identifying and removing a selected segment 140 of the rim 124, to define a remaining segment 142 of the rim 124. The selected segment 140 preferably includes the worn body element 125, the worn tread 126 and the worn flange 128. As can be seen in FIGS. 3A-3C, the remaining segment 142 includes a remaining body element 143 and a first engagement surface 144 on the remaining body element 143. Preferably, the first engagement surface 144 is at least partially planar and positioned to define an acute angle θ relative to the axis "2X". The acute angle θ has a vertex "V" and defines an opening 145 of the acute angle θ (FIG. 3B).

It will be understood that, in FIG. 3B, the line segment identified by reference character "$2X_1$" is parallel to the axis "2X".

Figure 3D:
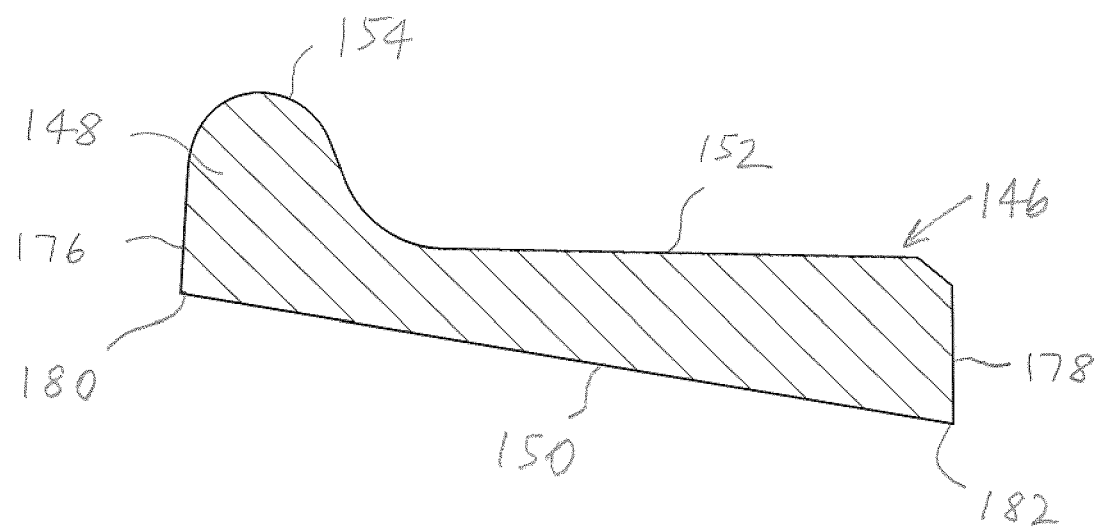
FIG. 3D is a cross-section of the replacement workpiece of FIG. 3A, drawn at a larger scale.

A replacement workpiece 146 is provided, to replace the selected segment 140 that has been removed (FIGS. 3B-3F). It is preferred that the replacement workpiece 146 includes a replacement body element 148 having a second engagement surface 150 thereon that is formed to mate with the first engagement surface 144 (FIG. 3C). As can be seen in FIG. 3D, the replacement workpiece 146 preferably includes a replacement tread 152 and a replacement flange 154 on the replacement body element 148 that are positioned on the replacement body element 148 opposite to the second engagement surface 150. Preferably, the replacement workpiece 146 is positioned to locate the second engagement surface 150 spaced apart from the first engagement surface 144 by a predetermined distance 155, to define a predetermined gap 156 between the first and second engagement surfaces 144, 150 (FIG. 3C).

It will be understood that only a portion of the replacement workpiece 146 is shown in FIGS. 3B-3F. Those skilled in the art would appreciate that the remaining segment 142 is circular in elevation view, centered on the axis "2X", and the replacement workpiece 146 is also circular in elevation view, formed to engage the remaining segment 142.

One or more heating elements 158 preferably are positioned in the predetermined gap 156, to heat respective first and second heated portions 136, 138 of the remaining body element 143 and the replacement body element 148, and the first and second engagement surfaces 144, 150, by induction heating. As can be seen in FIG. 3B, the first heated portion 136 extends a first preselected distance 137 from the first engagement surface 144 into the remaining body element 143 and the second heated portion 138 extends a second preselected distance 139 from the second engagement surface 150 into the replacement body element 148.

Those skilled in the art would appreciate that the first and second preselected distances 137, 139 may be determined based at least in part on various parameters, e.g., the average width or thickness of the remaining segment 142 in the vicinity of the first engagement surface 144, or the overall thickness of the replacement workpiece 146, i.e., between the second engagement surface 150 and the replacement tread 152, and the materials involved. The first and second preselected distances 137, 139 are each only a few millimeters.

It is also preferred that a non-oxidizing atmosphere is provided, to cover the first and second engagement surfaces 144, 150 and the first and second heated portions 136, 138 while they are heated. It will be understood that the non-oxidizing atmosphere is located inside an envelope or covering schematically represented by a dashed line in FIG. 3C identified for convenience by reference character 135.

In the non-oxidizing atmosphere, with the heating element(s) 158, the first and second heated portions 136, 138 and the first and second engagement surfaces 144, 150 preferably are heated by induction heating, to a predetermined hot working temperature. The hot working temperature is less than the material's melting temperature. As will be described, the first and second heated portions 136, 138 and the first and second engagement surfaces 144, 150 preferably are plastically deformable while at the hot working temperature.

While the first and second heated portions 136, 138 are at the hot working temperature, and while at least one of the first and second engagement surfaces 144, 150 is moving relative to the other, the first and second engagement surfaces 144, 150 are engaged together, and the replacement workpiece 146 is urged against the remaining segment 142 in a direction away from the vertex "V" and toward the opening 145, and against the remaining segment 142, to plastically deform the first and second engagement surfaces 144, 150 and also to plastically deform at least respective parts of the first and second heated portions 136, 138. The first and second engagement surfaces 144, 150 and the first and second heated portions 136, 138 preferably are then allowed to cool, to bond the replacement workpiece 146 and the remaining segment 142 of the rim 124 together.

While the heated portions 136, 138 and the engagement surfaces 144, 150 are at the hot working temperature, they are plastic, and they are forged together and subjected to shear, as described above. However, the temperature of the heated portions 136, 138 and the engagement surfaces 144, 150 quickly falls to below the hot working temperature after the heating elements are removed, and when the temperature thereof is less than the hot working temperature, the engagement surfaces and the heated portions are bonded together, as described above. It is preferred that the first and second engagement surfaces 144, 150 and the first and second heated portions 136, 138 are subsequently allowed to cool at a relatively slow rate to room temperature (e.g., approximately 20° C.).

Those skilled in the art would appreciate that, once the replacement workpiece 146 and the remaining segment 142 are bonded together as described above, a repaired rail wheel 112' (FIGS. 3E, 3G) may be subjected to machining, as required in order to conform the tread and flange of the repaired rail wheel 112' to a preselected design.

As can be seen in FIG. 3A, the rail wheel 112 has an inner side 160, at which the flange 128 is located, and an outer side 162, located opposite to the inner side 160. Accordingly, in FIG. 3F, it can be seen that, to bond the replacement workpiece 146 and the remaining segment 142, the replacement workpiece 146 is urged against the remaining segment 142 and also from the outer side 162 toward the inner side, in the direction generally indicated by arrow "A" in FIGS. 3C and 3F.

As noted above, the remaining segment 142 is circular in elevation view, as is the replacement workpiece 146. In one embodiment, as will be described, the external diameter of the inner and outer ends 168, 170 of the first engagement surface 144 relative to the axis preferably are slightly larger than the respective inner and outer ends 180, 182 of the second engagement surface 150.

It can be seen in FIG. 3A that the remaining segment 142 extends between inner and outer sides 164, 166 thereof that are proximal to the inner and outer sides 160, 162 of the rail wheel 112 respectively. Preferably, the first engagement surface 144 extends between first inner and first outer ends 168, 170 thereof, adjacent to the inner and outer sides 160, 162 of the remaining segment 142 respectively (FIG. 3C). The remaining segment 142 has a first external remaining segment radius 172 defined between the first inner end 168 (FIG. 3C) of the first engagement surface 144 and the axis "2X", and a second external remaining segment radius 174 defined between the first outer end 170 (FIG. 3C) of the first engagement surface 144 and the axis "2X" (FIG. 3A).

As can be seen in FIG. 3D, the replacement workpiece 146 extends between inner and outer sides 176, 178 thereof positionable proximal to the inner and outer sides 160, 162 of the rail wheel 112 respectively. The position of the replacement workpiece 146 relative to the inner and outer sides 160, 162, when the replacement workpiece 146 is engaged with the remaining segment 142, can be seen in FIGS. 3E and 3F. The second engagement surface 150 extends between second inner and second outer ends 180, 182 thereof, adjacent to the inner and outer sides 176, 178 of the replacement workpiece 146 respectively (FIG. 3D).

Figure 3E:
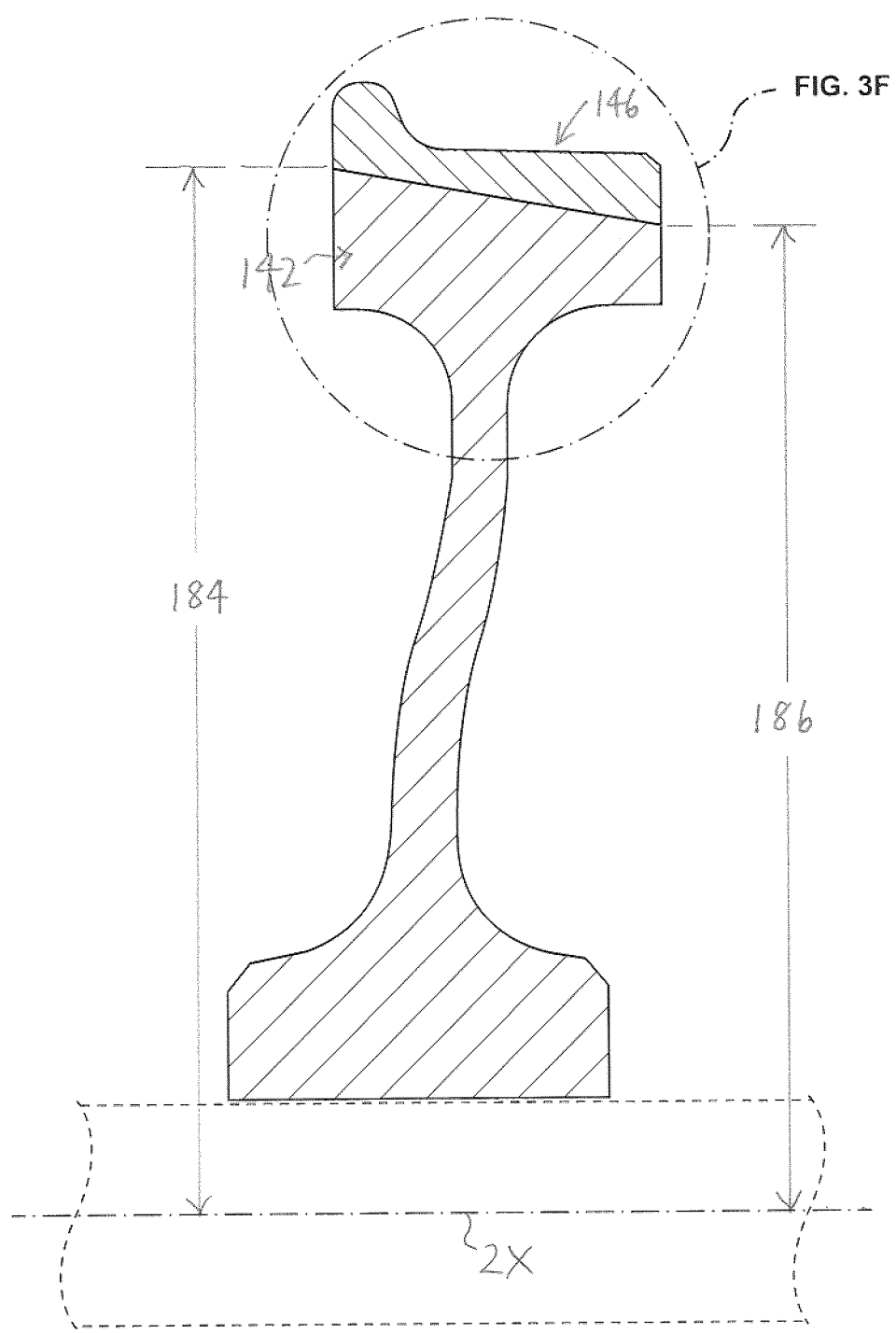
FIG. 3E is a cross-section of the remaining segment and the replacement workpiece of FIG. 3A engaged together, drawn at a smaller scale.
Figure 3F:
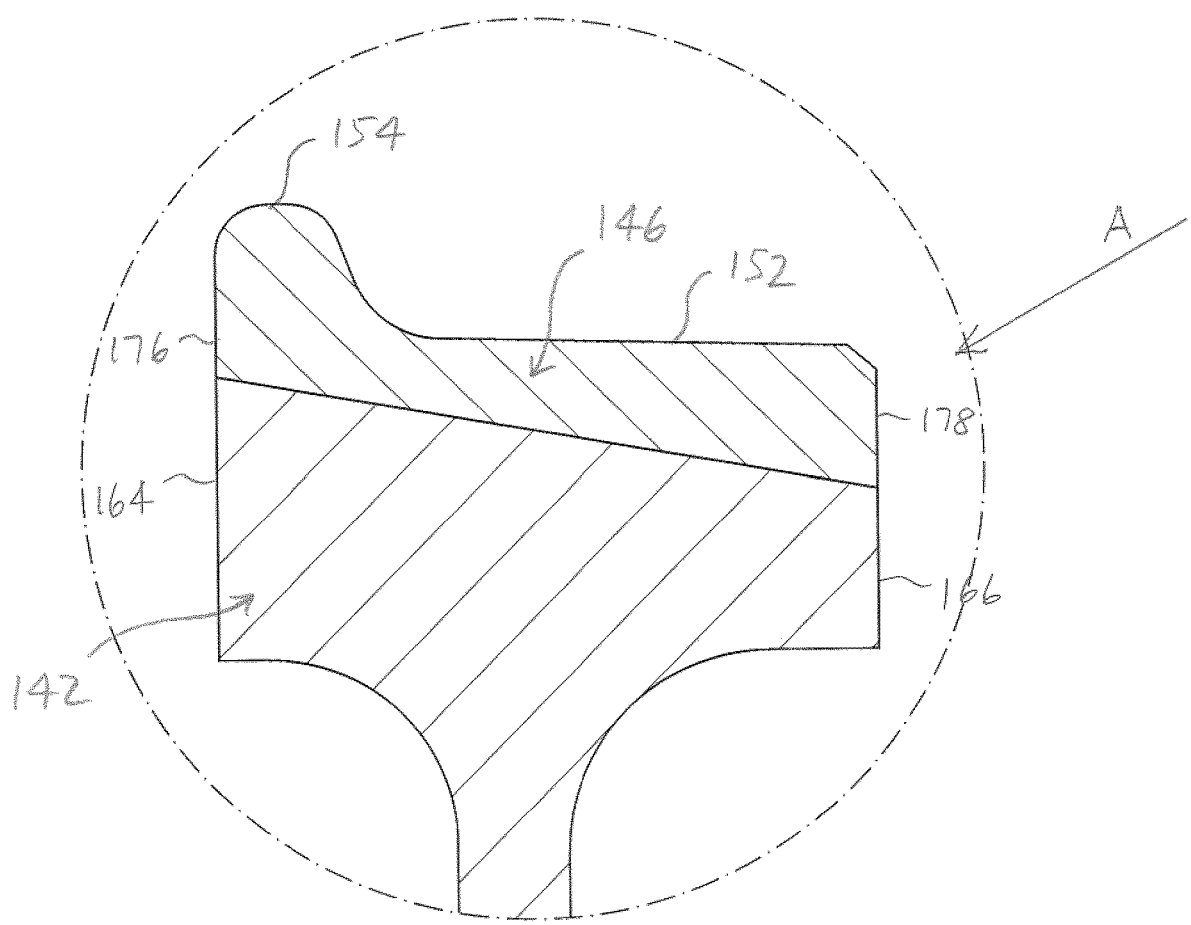
FIG. 3F is a part of the cross-section of FIG. 3E, drawn at a larger scale.

The replacement workpiece 146 preferably has a first internal replacement workpiece radius 184 defined between the second inner end 180 of the second engagement surface 150 and the axis "2X", when the second engagement surface 150 is engaged with the first engagement surface 144, and a second internal replacement workpiece radius 186 defined between the second outer end 182 of the second engagement surface 150 and the axis "2X", when the second engagement surface 150 is engaged with the first engagement surface 144 (FIG. 3E).

The first internal replacement workpiece radius 184 preferably is less than the first external remaining segment radius 172. Also, the second internal replacement workpiece radius 186 preferably is less than the second external remaining segment radius 174.

It will be understood that, because of the slight differences between (i) the first internal replacement workpiece radius 184 and the first external remaining segment radius 172, and between (ii) the second internal replacement workpiece radius 186 and the second external remaining segment radius 174, when the replacement workpiece 146 and the remaining segment 142 are first engaged, the replacement workpiece 146 is offset relative to the remaining segment 142 by a small distance to the right, as viewed in FIGS. 3B and 3C. To simplify the illustrations, however, in FIGS. 3B and 3C, the replacement workpiece 146 is not shown as being offset relative to the remaining segment 142, and also the width of the predetermined gap 156 is exaggerated.

It will also be understood that the internal diameters of the replacement workpiece 146, i.e., at selected locations along the second engagement surface 150, correspond to the radii at the selected locations on the second engagement surface 150 respectively. Similarly, the external diameters of the remaining segment 142, at corresponding selected locations on the first engagement surface 144, correspond to the radii at the selected locations on the first engagement surface 144 respectively.

Those skilled in the art would appreciate that, when the heated portions 136, 138 and the engagement surfaces 144, 150 are at the hot working temperature, the internal radius of the replacement workpiece 146 at a first selected location on the engagement surface 150 preferably is slightly smaller than the external radius of the engagement surface 144 of the remaining segment 142 at a second selected location corresponding to the first selected location. It will be understood that the differences between the internal radius of the replacement workpiece 146 (defined by the second engagement surface 150) and the external radius of the remaining segment 142 (defined by the first engagement surface 144) are very small, and are not shown in the drawings herein accordingly.

Preferably, the fit between the engagement surfaces 144, 150 is a suitable force fit. That is, when the replacement workpiece 146 is urged onto the remaining segment 142, a certain amount of force is used (i.e., applied in the direction generally indicated by arrow "A" in FIGS. 3C and 3F), because the internal diameter of the replacement workpiece is less than the external diameter of the remaining segment. However, it will be understood that the force applied is only sufficient to locate the replacement workpiece 146 in a final position thereof, in which the inner and outer sides 176, 178 thereof are aligned with the respective inner and outer sides 164, 166. The replacement workpiece 146 is shown in the final position thereof, relative to the remaining segment 142, in FIGS. 3E and 3F.

As noted above, the heated portions 136, 138 are relatively small parts of the replacement workpiece 146 and the remaining segment 142 respectively. Also, as can be seen in FIG. 3B, the heated portions 136, 138 are adjacent to and contiguous with the first and second engagement surfaces 144, 150. Accordingly, when the heated portions 136, 138 and the first and second engagement surfaces 144, 150 are heated to the hot working temperature, if the heated portions 136, 138 and the first and second engagement surfaces 144, 150 are subject to thermal expansion, they would tend to expand generally outwardly (i.e., away from the axis) and inwardly (i.e., toward the axis). However, any tendency to expansion of the heated portion 136 and the first engagement surface 144 would be constrained by the balance of the remaining segment 142, which is not heated to the hot working temperature. Similarly, any tendency to expansion of the heated portion 138 and the second engagement surface 150 would be constrained by the balance of the replacement workpiece 146, which is not heated to the hot working temperature.

It is believed that, because the heated portions 136, 138 are relatively small parts of the replacement workpiece 146 and the remaining segment 142 respectively, and also because the replacement workpiece 146 and the remaining segment 142 are circular in elevation view, the heated portions 136, 138 are squeezed and subjected to stress as a result of thermal expansion of the heated portions 136, 138 and the first and second engagement surfaces 144, 150. It is also believed that the plastic deformation of the first and second heated portions 136, 138 and the first and second engagement surfaces 144, 150 while they are at the hot working temperature at least partially relieves such stress, in a dynamic rebalancing process.

Those skilled in the art would also appreciate that, to the extent that there is thermal expansion of the first and second heated portions 136, 138 and the first and second engagement surfaces 144, 150 when they are heated to the hot working temperature, such thermal explansion is taken into account when the replacement workpiece 146 and the remaining segment 142 are formed, in order to ensure that the fit between the first and second engagement surfaces 144, 150 is a suitable force fit.

Those skilled in the art would also appreciate that, after the replacement workpiece 146 is in the final position on the remaining segment 142 (FIGS. 3E, 3F), when the heated portions 136, 138 and the engagement surfaces 144, 150 cool to an ambient temperature, the replacement workpiece 146 is also secured to the remaining segment 142 due to thermal contraction of the replacement workpiece 146. As noted above, once the replacement workpiece 146 is in the final position thereof relative to the remaining segment 142, some machining may be needed to conform the repaired rail wheel 112' to the preselected design therefor.

Figure 3G:
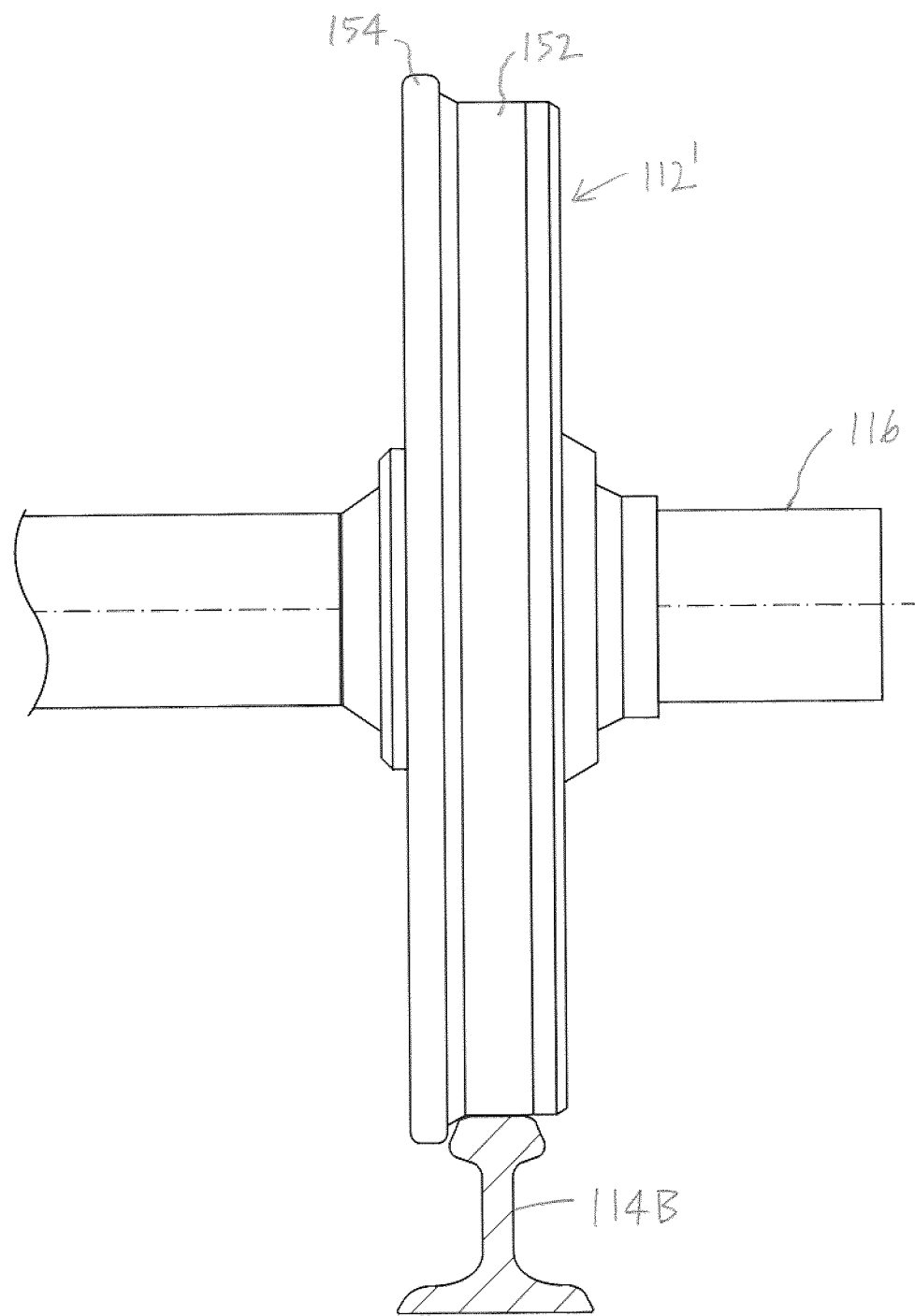
FIG. 3G is a side view of a repaired rail wheel, drawn at a smaller scale.

For convenience, the repaired rail wheel is identified in FIGS. 3E and 3G by reference character 112'. As can be seen in FIG. 3G, the replacement tread 152 and the replacement flange 154 of the repaired rail wheel 112' are formed for engagement with the rail 114B.

As noted above, the selected portion 140 is first removed, by any suitable method, to leave the remaining portion 142 of the rim 124. Those skilled in the art would be aware of suitable methods of removing the selected portion 140. It can be seen in FIGS. 3A and 3B that, upon removal of the selected portion 140, the first engagement surface 144, which is part of the remaining portion 142, is exposed. It will be understood that the rail wheel 112 is round, centered on the axis, and that only a part of the worn rail wheel 112 that is to be repaired is illustrated in FIG. 3A, for clarity of illustration.

After the selected segment 140 has been removed, the replacement workpiece 146 is provided, and positioned relative to the remaining segment 142 so that the predetermined gap 156 is defined between the first and second engagement surfaces 144, 150. The first and second engagement surfaces 144, 150 are spaced apart by the predetermined distance 155. Those skilled in the art would appreciate that the predetermined distance 155 may be determined by taking into account, among other things, the heat generated by the heating element(s) 158 and the amount of time required for the heating element(s) 158 to heat the first and second heated portions 136, 138 and the first and second engagement surfaces 144, 150 to the hot working temperature. The type of steel and the geometry of the rail wheel would need to be taken nto account as well.

As illustrated in FIG. 3A, in one embodiment, the first and second engagement surfaces 144, 150 preferably are planar and substantially parallel, and are both positioned to define the acute angle θ relative to the axis "2X" of the axle 116. However, the engagement surfaces may not be planar.

Advantageously, the method of the invention enables the selected portion 140 to be replaced by the replacement workpiece 146 without removing the wheel 112 from the axle 116. In FIG. 3G, the repaired rail wheel 112' remains mounted to the axle.

As can be seen in FIG. 3A, the first and second engagement surfaces 144, 150 preferably are formed and located so as to define the acute angle θ relative to the axis "2X" that opens toward an inner side 160 of the rail wheel 112. As can be seen in FIG. 3B, in one embodiment, the vertex "V" of the acute angle θ may be located proximal to the outer side 162 of the rail wheel. However, it will be understood that the remaining segment may be formed so that the first engagement surface is positioned differently, e.g., so that the acute angle defined thereby has a vertex proximal to the inner side 160 (FIGS. 4A-4F), as will be described.

In FIG. 3C, the heating elements 158 are shown positioned in the gap 156. An outer perimeter 135 of the non-oxidizing atmosphere is represented by a dashed line in FIG. 3C. Those skilled in the art would be aware that the non-oxidizing atmosphere (not shown) preferably is contained, or substantially contained, around the outer edges of the first and second heated portions 136, 138 and the first and second engagement surfaces 144, 150 by a temporary structure (e.g., a box that generally fits onto the replacement workpiece 146 and the remaining segment 142 around its edge) 135 that can be quickly installed and removed. Once the non-oxidizing atmosphere has been established, the heating element(s) are energized, to heat the first and second engagement surfaces 144, 150 to the hot working temperature.

Those skilled in the art would be aware that the non-oxidizing atmosphere can be created by covering the region in which the non-oxidizing atmosphere is to be located and by displacing the air by a suitable inert gas (e.g., argon) that is pumped into the container. It will be understood that, for such displacement to take place, the container is not airtight. Because those skilled in the art would be aware of how to temporarily establish a non-oxidizing atmosphere over a selected area, further discussion of the non-oxidizing atmosphere is unnecessary.

As noted above, once the first and second heated portions 136, 138 and the first and second engagement surfaces 144, 150 are at the hot working temperature, the heating elements 158 preferably are removed from the gap 156, and the non-oxidizing atmosphere is also removed. Shortly thereafter, one or both of the first and second engagement surfaces 144, 150 preferably are moved relative to the other in any suitable motion, e.g., in a circular or similar motion. The replacement workpiece 146 is pushed in the direction generally indicated by arrow "A" in FIG. 3C, to engage the first and second engagement surfaces 144, 150 together, preferably while one or both of the engagement surfaces 144, 150 is moving relative to the other.

For instance, in one embodiment, the replacement workpiece 146 preferably is rotated about the axis "2X" while the first and second engagement surfaces 144, 150 and the first and second heated portions 136, 138 are at the hot working temperature and when the first and second engagement surfaces 144, 150 are engaged together.

It will be understood that, immediately after their initial engagement, one or both of the first and second engagement surfaces 144, 150 preferably are continuously moved relative to each other, e.g., in a circular or similar motion about an axis orthogonal to the engagement surfaces 144, 150, for deformation of at least parts of the first and second heated portions 136, 138 and the first and second engagement surfaces 144, 150. Alternatively, the relative motion may result from movement of the replacement workpiece 146 in the direction indicated by arrow "A" while the remaining segment 142 is stationary. Once the heated portions have cooled to a temperature less than the hot working temperature, the relative motion ceases. The replacement portion 146 and the remaining portion 142 are allowed to cool to ambient temperature, to metallurgical bond the replacement portion 146 and the remaining portion 142 together. Also, as noted above, because the fit is a suitable force fit, upon cooling, the replacement workpiece 146 is secured due to thermal contraction thereof.

Those skilled in the art would appreciate that the hot working temperature may be any suitable temperature, for the material. As noted above, the hot working temperature may be any temperature at which the steel is plastically deformable. For example, the hot working temperature may be approximately 1,265° C. However, different parameters, e.g., the type of steel, may affect the hot working temperature that is selected.

It will be understood that, unlike conventional frictional welding, in the method of the invention, the heat is primarily provided via the heating elements, i.e., via induction heating. It will also be understood that the heat energy generated in the method of the invention due to the motion of one or both of the first and second engagement surfaces 144, 150 while they are engaged is not significant compared with the heat generated via induction heating. It is believed that approximately 95% or more of the heat required for bonding is provided via induction heating, and the balance of approximately 5% or less is provided by the forging and the shearing to which the heated portions 136, 138 and the first and second engagement surfaces 144, 150 are subjected, when the first and second engagement surfaces 144, 150 are engaged (i.e., pushed or urged together) and one or both are moved relative to the other.

One consequence of this is that, as compared to the equipment required for conventional friction welding, the equipment utilized for moving one or more of the first and second engagement surfaces 144, 150, and for engaging the first and second engagement surfaces 144, 150 can be relatively less heavy or substantial. Also, because most of the heat is provided by the energized heating elements, using the method of the invention, the worn rail wheel 112 may be repaired while the rail wheel 112 remains mounted on the axle 116.

Those skilled in the art would appreciate that repairing the rail wheel 112 when it is mounted on the axle 116 can be done relatively expeditiously. If conventional repair methods are used, the time spent taking the worn wheel off the axle 116, and subsequently mounting the repaired wheel on the axle 116, may be substantial.

Those skilled in the art would also appreciate that the method of the invention may be used to join elements (i.e., the remaining segment 142 and the replacement workpiece 146) that are made of dissimilar materials. For example, the replacement workpiece 146 may be made of forged steel, and the remaining workpiece 142 may be made of cast steel, or vice versa.

Figure 4A:
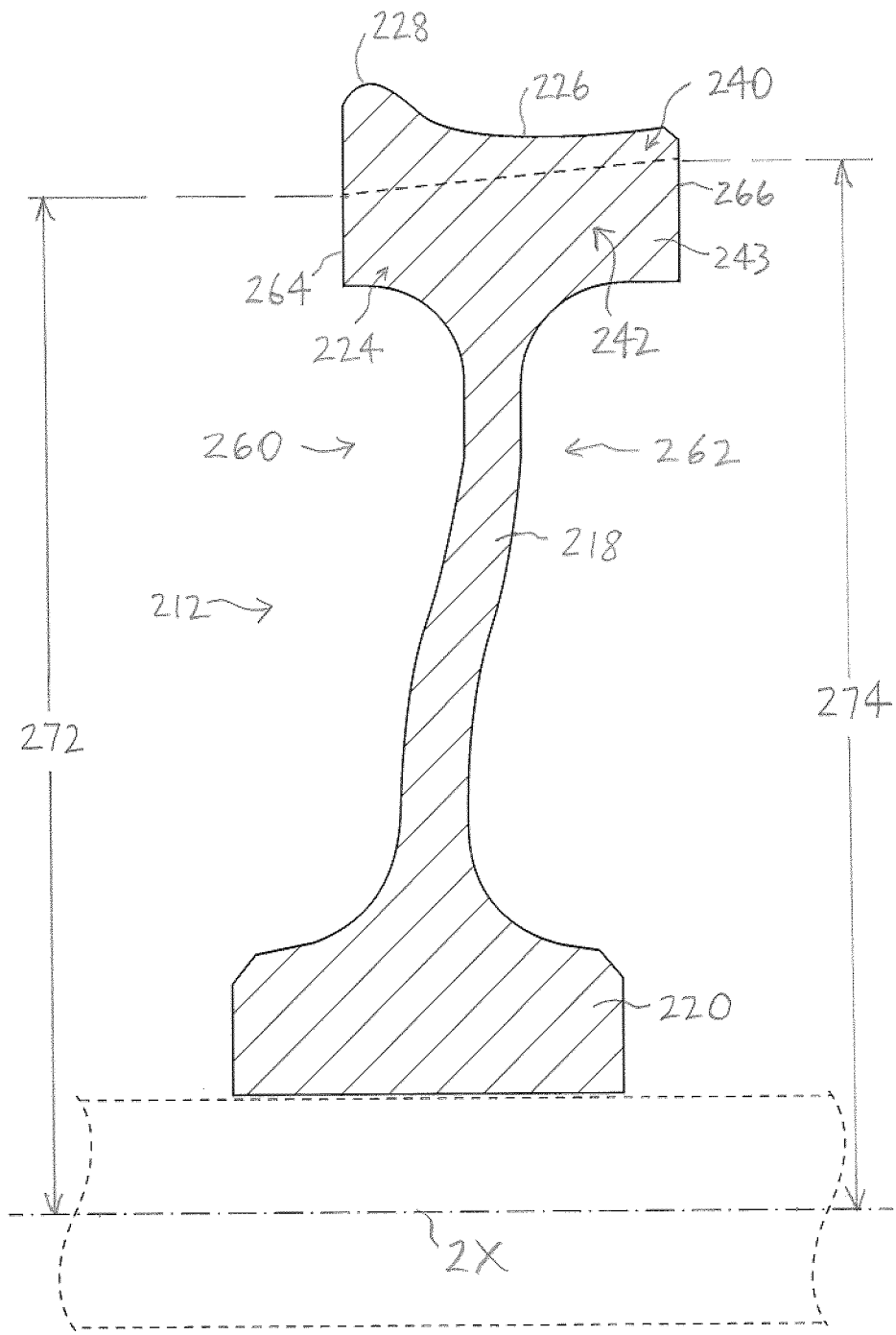
FIG. 4A is a cross-section of a portion of a worn rail wheel to be repaired, drawn at a larger scale.

An alternative embodiment of the method of the invention is illustrated in FIGS. 4A-4F. In FIG. 4A, a selected segment 240 of a worn rail wheel 212 to be removed is identified. The rail wheel 212 includes a boss 220 in which the axle 116 is receivable, and a web 218 connects the boss 220 and a rim 224 (FIG. 4A). The rail wheel 212 has inner and outer sides 260, 262.

Figure 4B:
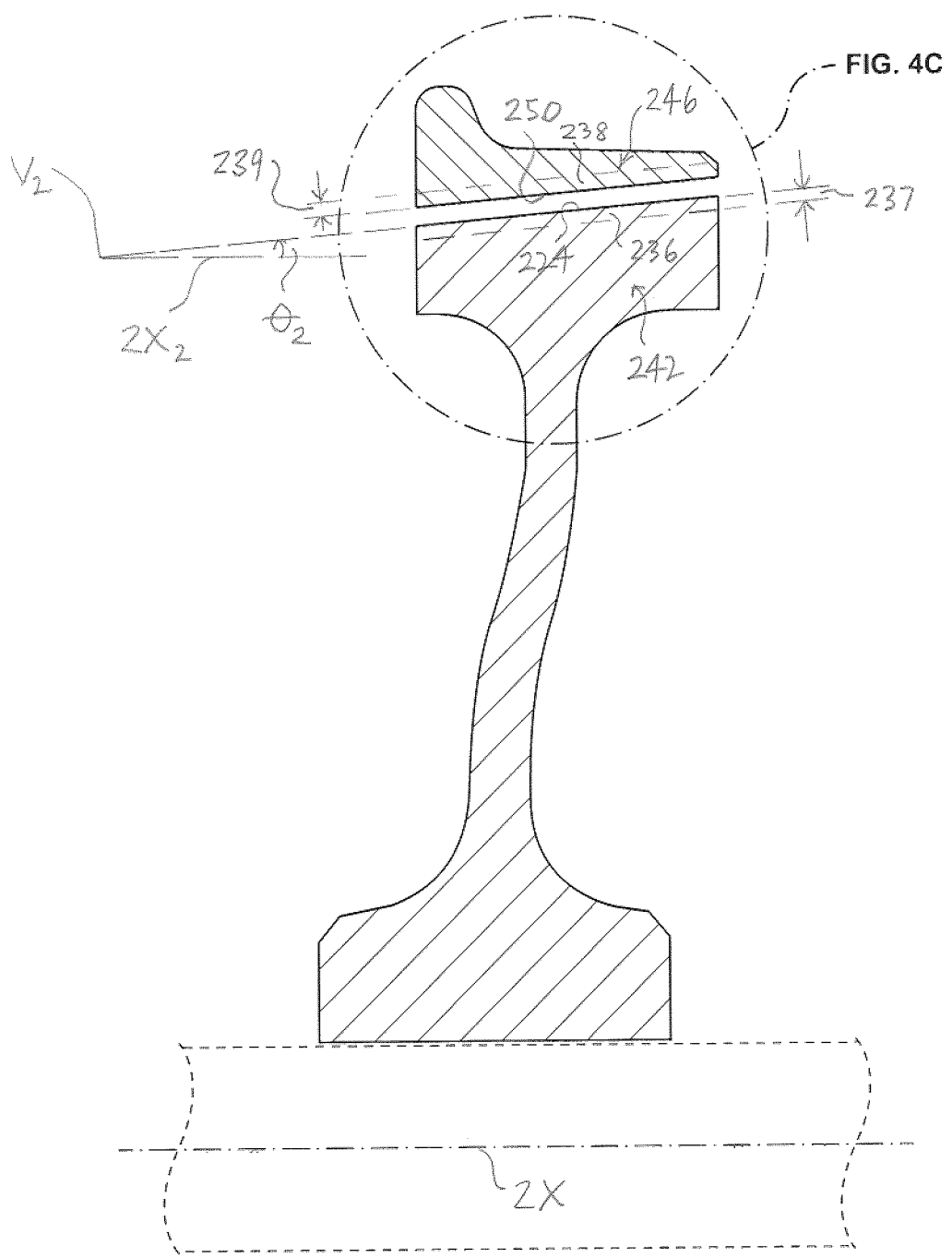
FIG. 4B is a cross-section of a remaining segment of the rail wheel of FIG. 2C with an alternative embodiment of a replacement workpiece located to define a predetermined gap therebetween.

First, the selected segment 240 is removed from the rim 224, so that a remaining portion 242 of the rim 224 remains (FIG. 4B). It will be understood that the selected segment 240 includes a worn tread 226 and a worn flange 228 (FIG. 4A). The remaining portion 242 includes a remaining body element 243 and a first engagement surface 244 on the remaining body element 243. A replacement workpiece 246 is provided, which includes a replacement body element 248 with a second engagement surface 250 that is formed to mate with the first engagement surface 244 (FIGS. 4B, 4C).

In this embodiment, the first and second engagement surfaces 244, 250 preferably are formed and located so as to define an acute angle $\theta_2$ relative to the axis "2X" of the axle 116 that opens toward an outer side 262 of the rail wheel 212 (FIG. 4A). The acute angle $\theta_2$ has a vertex "$V_2$" and defines an opening 245 of the acute angle $\theta_2$.

It will be understood that, in FIG. 4B, the line segment "$2X_2$" is parallel to the axis "2X".

Figure 4C:
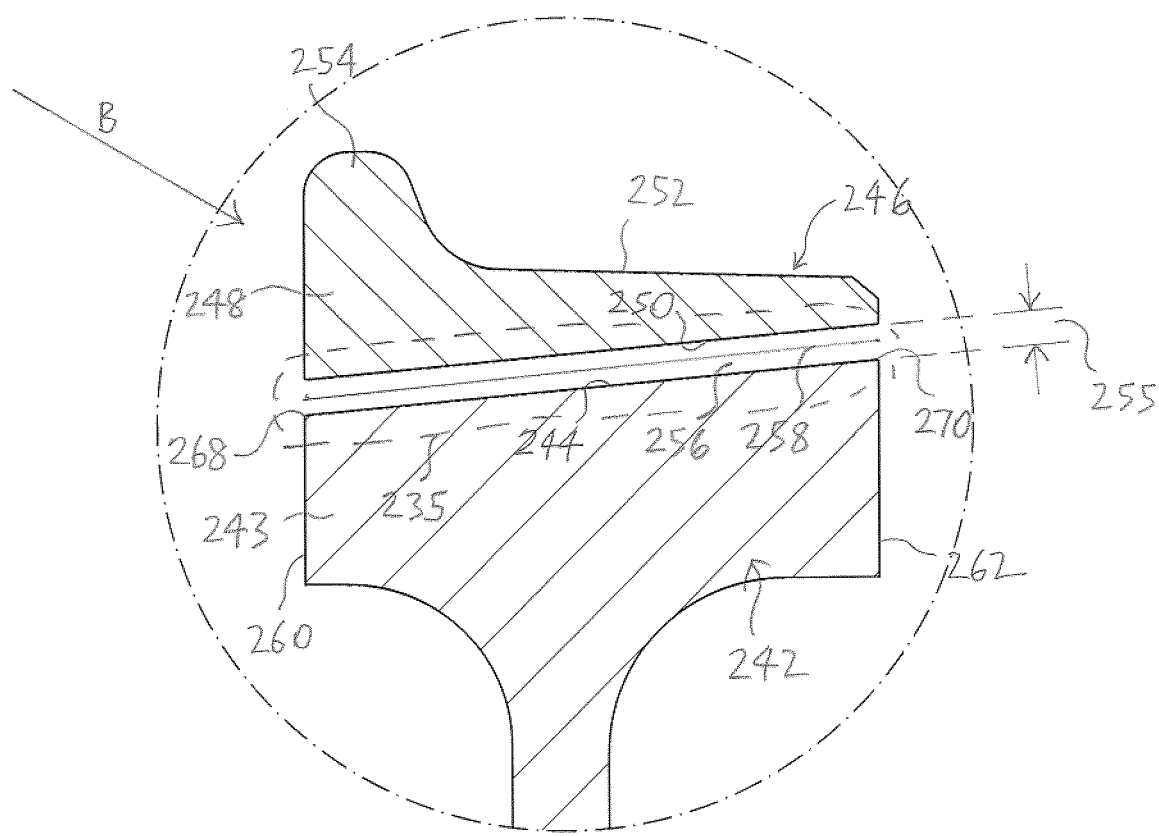
FIG. 4C is a part of the cross-section of FIG. 4B, drawn at a larger scale.

Preferably, the replacement workpiece 246 is located relative to the remaining portion 242 so that the first and second engagement surfaces 244, 250 are spaced apart by a predetermined distance 255 to define a predetermined gap 256 therebetween (FIG. 4C).

It will be understood that in this embodiment also, one or more heating elements 258 preferably are positioned in the gap 256 (FIG. 4C), and a non-oxidizing atmosphere is established inside a perimeter 235 (FIG. 4C). The perimeter 235 is a perimeter of a suitable device for containing the non-oxidizing atmosphere when the heating element 258 is energized. The first and second engagement surfaces 244, 250 and first and second heated portions 236, 238 are heated to the hot working temperature by induction heating, in the non-oxidizing atmosphere. As can be seen in FIG. 4B, the first heated portion 236 extends a first preselected distance 237 from the first engagement surface 244 into the remaining body element 243 and the second heated portion 238 extends a second preselected distance 239 from the second engagement surface 250 into the replacement body element 248.

Once the first and second heated portions 236, 238 and the first and second engagement surfaces 244, 250 are heated to the hot working temperature, the heating elements 258 are removed, and the non-oxidizing atmosphere is also removed.

Figure 4D:
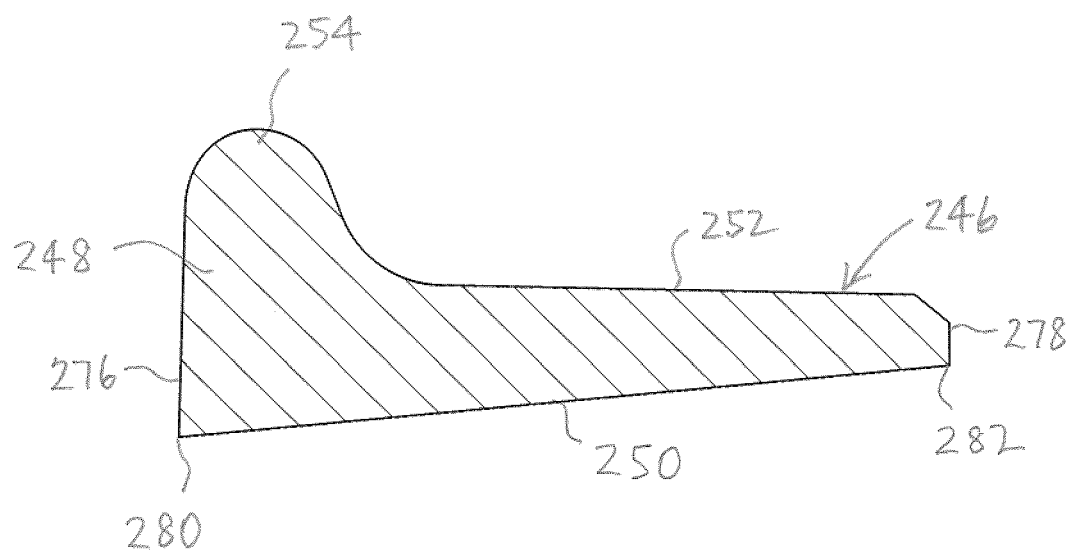
FIG. 4D is a cross-section of the replacement workpiece of FIG. 4B, drawn at a larger scale.
Figure 4E:
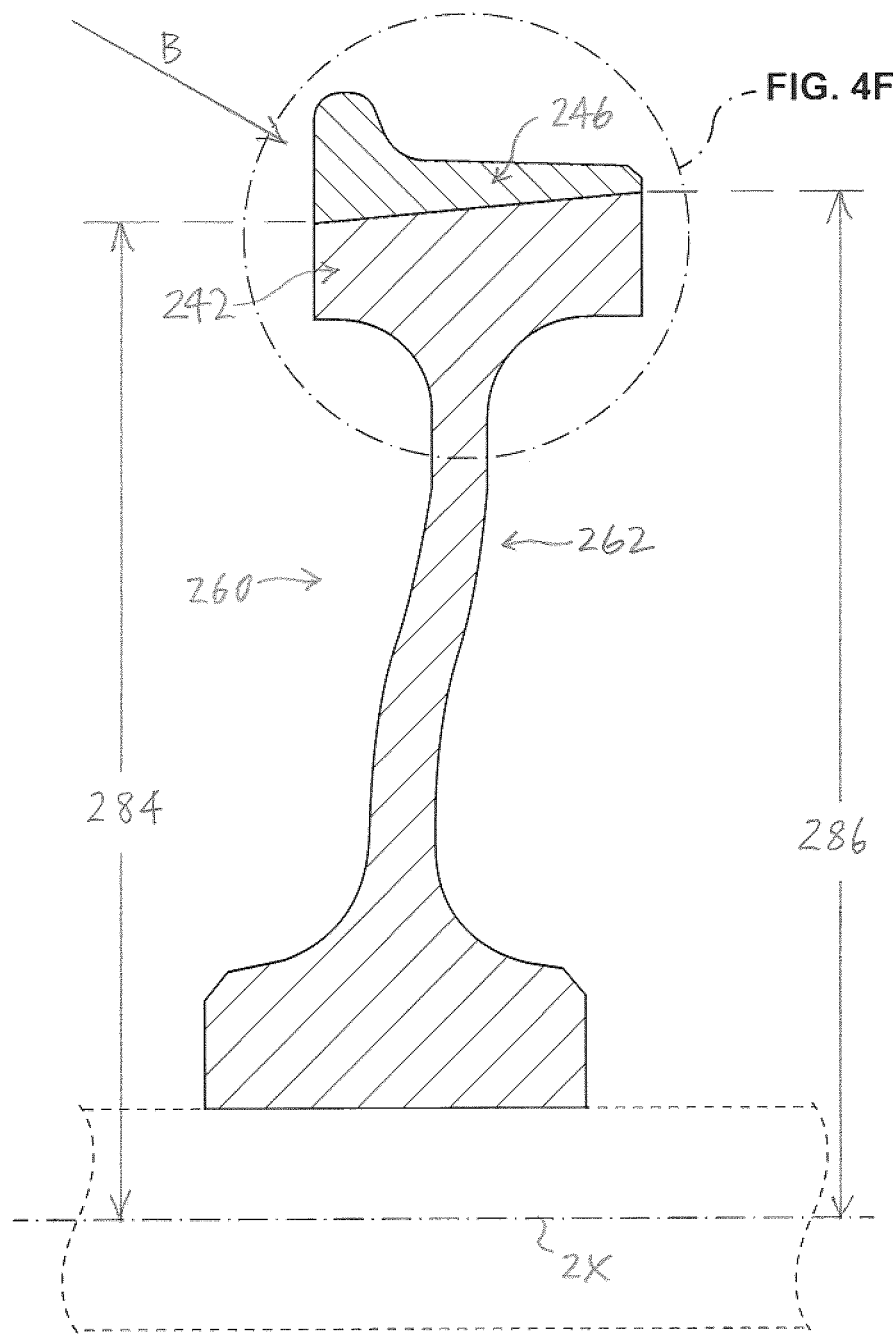
FIG. 4E is a cross-section of the remaining segment and the replacement workpiece of FIG. 4D engaged together, drawn at a smaller scale.
Figure 4F:
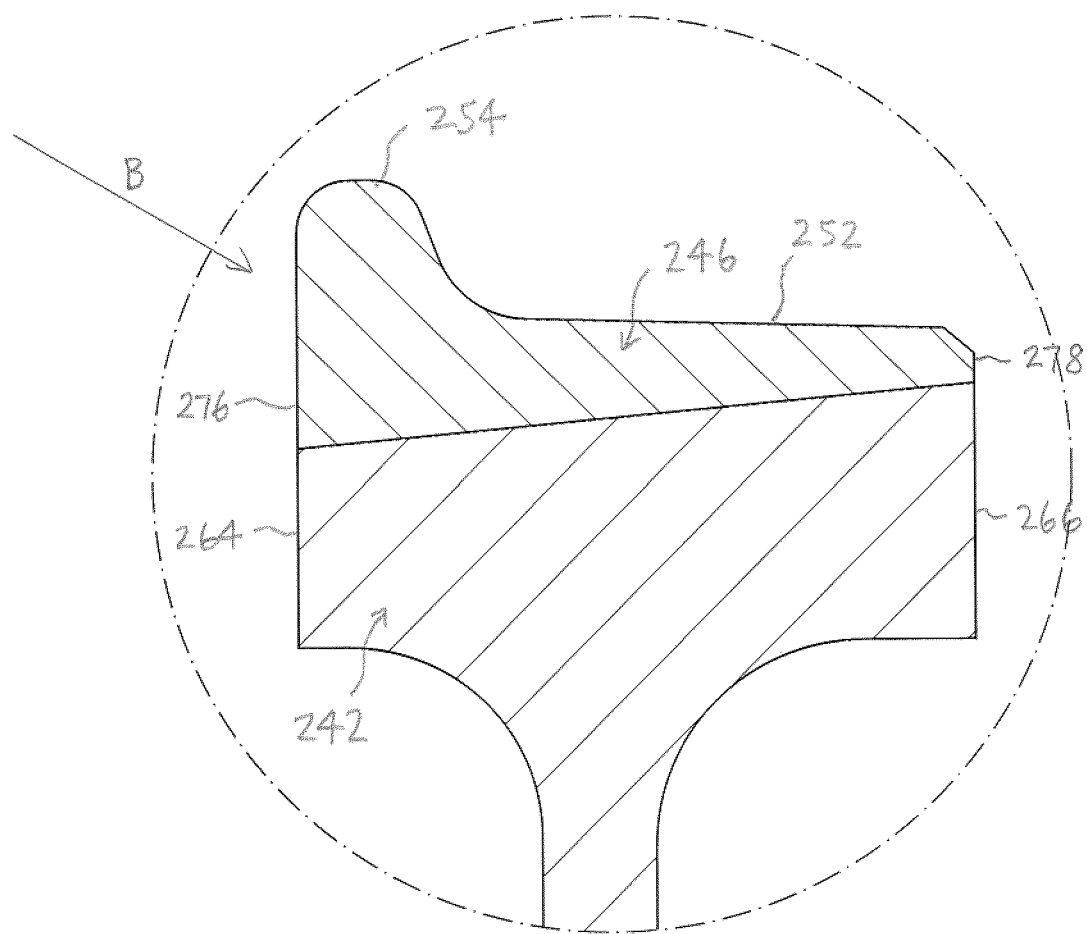
FIG. 4F is a part of the cross-section of FIG. 4E, drawn at a larger scale.

While the first and second engagement surfaces 244, 250 and the first and second heated portions 236, 238 are at the hot working temperature, the replacement workpiece 246 is pushed in the direction generally indicated by arrow "B" in FIGS. 4C and 4F, to engage the second engagement surface 250 with the first engagement surface 244. It will be understood that, after the initial engagement thereof, one or both of the first and second engagement surfaces 244, 250 is moved relative to the other, e.g., in a circular or similar motion about an axis orthogonal to the engagement surfaces 244, 250, as the replacement workpiece 246 is urged against the remaining portion 242, to at least partially deform one or both of the first and second engagement surfaces 244, 250 and the first and second heated portions 236, 238.

The replacement portion 246 and the remaining portion 242 are then allowed to cool, to bond them together. The repaired rail wheel is identified in FIG. 4C by reference character 212' for clarity of illustration.

As noted above, after the first and second engagement surfaces are initially engaged, one or both of them preferably is moved relative to the other. Such relative movement may be circular or similar movement about an axis orthogonal to the engagement surfaces, or any other movement while engaged. The first and second engagement surfaces preferably are both at the hot working temperature when they are first engaged. Those skilled in the art would appreciate that, shortly after engagement, the first and second engagement surfaces will become fused together due to a relatively rapid decrease in temperature from the hot working temperature. Those skilled in the art would also appreciate that the temperature of the first and second engagement surfaces 244, 250 and the first and second heated portions 236, 238 rapidly falls after the heating elements 258 are removed from the predetermined gap.

Accordingly, it will be understood that, as a practical matter, the first and second engagement surfaces preferably are engaged as soon as the heating elements have been removed. As a practical matter, in view of the relatively short time in which the engagement surfaces may be moved relative to each other after they are initially engaged, it may be advantageous to commence moving one or both of the engagement surfaces immediately upon withdrawal of the heating elements, and before the engagement surfaces are engaged.

In practice, in order to move one or both of the engagement surfaces 244, 250 relative to the other, those elements with the engagement surfaces thereon must be engaged or held by suitable elements. Those skilled in the art would appreciate that, where the rail wheel has been repaired while it is mounted on the axle (FIGS. 3A-3G), movement of the second engagement surface 150 relative to the first engagement surface 144 may be effected by moving the replacement workpiece 146 accordingly. As noted above, movement of the second engagement surface relative to the first engagement surface while the two surfaces are engaged results in plastic deformation of at least parts of the engagement surfaces and the first and second heated portions.

As described above, the selected segment 140 preferably is identified and removed to provide the remaining segment 142, and the first engagement surface 144 on the remaining segment element 143. In one embodiment, the first engagement surface 144 preferably is at least partially planar and positioned at least partially transverse to the axis "2X".

As can be seen, e.g., in FIGS. 3B and 3C, it is also preferred that the second engagement surface 150 is at least partially planar, and positioned at least partially transverse to the axis "2X" to define the predetermined gap 156.

In one embodiment, as shown in FIG. 3B, the first and second engagement surfaces 144, 150 preferably are positioned to define the first acute angle $\theta$ relative to the axis "2X", the first acute angle opening toward the inner side 160 of the rail wheel 112.

In one embodiment, the first and second engagement surfaces 144, 150 preferably are positioned to define the first acute angle $\theta$ having the first acute angle vertex "V" that is located proximal to the outer side 162 of the rail wheel 112 (FIG. 3B). In this embodiment, when the first and second heated portions and the first and second engagement surfaces are at the hot working temperature, and the first and second engagement surfaces are engaged together, the replacement workpiece is urged toward the inner side 160 of the rail wheel 112 (FIGS. 3B-3F).

In another embodiment, as shown in FIG. 4B, the first and second engagement surfaces 244, 250 preferably are positioned to define the second acute angle $\theta_2$ relative to the axis, the second acute angle opening toward the outer side 162 of the rail wheel 112.

In another embodiment, the first and second engagement surfaces 244, 250 preferably are positioned to define a second acute angle vertex "$V_2$" that is located proximal to the inner side 160 of the rail wheel 112 (FIG. 4B). In this embodiment, when the first and second heated portions and the first and second engagement surfaces are at the hot working temperature, and the first and second engagement surfaces are engaged together, the replacement workpiece 246 is urged toward the outer side 262 of the rail wheel 112 (FIGS. 4B-4F).

The remaining segment 242 is circular in elevation view, as is the replacement workpiece 246. In one embodiment, as will be described, the external diameter of inner and outer ends 268, 270 of the first engagement surface 244 relative to the axis preferably are slightly larger than respective inner and outer ends 280, 282 of the second engagement surface 250.

It can be seen in FIG. 4A that the remaining segment 242 extends between inner and outer sides 264, 266 thereof that are proximal to the inner and outer sides 260, 262 of the rail wheel 212 respectively. Preferably, the first engagement surface 244 extends between first inner and first outer ends 268, 270 thereof, adjacent to the inner and outer sides 260, 262 of the remaining segment 242 respectively (FIG. 4C). The remaining segment 242 has a first external remaining segment radius 272 defined between the first inner end 268 (FIG. 4C) of the first engagement surface 244 and the axis "2X", and a second external remaining segment radius 274 defined between the first outer end 270 (FIG. 4C) of the first engagement surface 244 and the axis "2X" (FIG. 4A).

As can be seen in FIG. 4D, the replacement workpiece 246 extends between inner and outer sides 276, 278 thereof positionable proximal to the inner and outer sides 260, 262 of the rail wheel 212 respectively. The position of the replacement workpiece 246 relative to the inner and outer sides 260, 262, when the replacement workpiece 246 is engaged with the remaining segment 242, can be seen in FIGS. 4E and 4F. The second engagement surface 250 extends between second inner and second outer ends 280, 282 thereof, adjacent to the inner and outer sides 276, 278 of the replacement workpiece 246 respectively (FIG. 4D).

The replacement workpiece 246 preferably has a first internal replacement workpiece radius 284 defined between the second inner end 280 of the second engagement surface 250 and the axis "2X", when the second engagement surface 250 is engaged with the first engagement surface 244, and a second internal replacement workpiece radius 286 defined between the second outer end 282 of the second engagement surface 250 and the axis "2X", when the second engagement surface 250 is engaged with the first engagement surface 244 (FIG. 4E).

The first internal replacement workpiece radius 284 preferably is less than the first external remaining segment radius 272. Also, the second internal replacement workpiece radius 286 preferably is less than the second external remaining segment radius 274.

It will be understood that, because of the slight differences between (i) the first internal replacement workpiece radius 284 and the first external remaining segment radius 272, and between (ii) the second internal replacement workpiece radius 286 and the second external remaining segment radius 274, when the replacement workpiece 246 and the remaining segment 242 are first engaged, the replacement workpiece 246 is offset relative to the remaining segment 242 by a small distance to the left, as viewed in FIGS. 4B and 4C. To simplify the illustrations, however, in FIGS. 4B and 4C, the replacement workpiece 246 is not shown as being offset relative to the remaining segment 242, and also the width of the predetermined gap 256 is exaggerated.

It will be understood that the internal diameters of the replacement workpiece 246, i.e., at selected locations along the second engagement surface 250, correspond to the radii at the selected locations on the second engagement surface 250 respectively. Similarly, the external diameters of the remaining segment 242, at corresponding selected locations on the first engagement surface 244, correspond to the radii at the selected locations on the first engagement surface respectively.

Those skilled in the art would appreciate that, when the heated portions 236, 238 and the engagement surfaces 244, 250 are at the hot working temperature, the internal radius of the replacement workpiece 246 at a first selected location on the engagement surface 250 preferably is slightly smaller than the external radius of the engagement surface 244 of the remaining segment 242 at a second selected location corresponding to the first selected location. It will be understood that the differences between the internal radius of the replacement workpiece 246 (defined by the second engagement surface 250) and the external radius of the remaining segment 242 (defined by the first engagement surface 244) are very small, and are not shown in the drawings herein accordingly.

Preferably, the fit between the engagement surfaces 244, 250 is a suitable force fit. That is, when the replacement workpiece 246 is urged onto the remaining segment 242, a certain amount of force is used (i.e., applied in the direction generally indicated by arrow "B" in FIGS. 4C and 4F), because the internal diameter of the replacement workpiece is less than the external diameter of the remaining segment. However, it will be understood that the force applied is only sufficient to locate the replacement workpiece 246 in a final position thereof, in which the inner and outer sides 276, 278 thereof are aligned with the respective inner and outer sides 264, 266. The replacement workpiece 146 is shown in the final position thereof, relative to the remaining segment 242, in FIGS. 4E and 4F.

Those skilled in the art would also appreciate that the thermal expansion of the replacement workpiece 246 and of the remaining segment 242 (i.e., due to heating of the first and second heated portions 236, 238 and the first and second engagement surfaces 244, 250 to the hot working temperature) is taken into account when the replacement workpiece 246 and the remaining segment 242 are formed, in order to ensure that the fit between the first and second engagement surfaces 244, 250 is a suitable force fit.

Those skilled in the art would also appreciate that, after the replacement workpiece 246 is in the final position on the remaining segment 242 (FIGS. 4E, 4F), when the heated portions 236, 238 and the engagement surfaces 244, 250 cool to an ambient temperature, the replacement workpiece 246 is also secured to the remaining segment 242 due to thermal contraction of the replacement workpiece 246.

For convenience, the repaired rail wheel is identified in FIG. 4E by reference character 212'.

In one embodiment, the method of the invention preferably additionally includes providing one or more first projections 387 extending from an outer side 378 of the replacement workpiece 346. Preferably, each of the first projections 387 is engaged by a first engagement tool 388 (FIG. 5A), when the first and second heated portions and the first and second engagement surfaces are at the hot working temperature and the first and second engagement surfaces are engaged together, engaging the first projection 387, and urging the replacement workpiece 346 toward the inner side of the rail wheel 312.

Figure 5B:
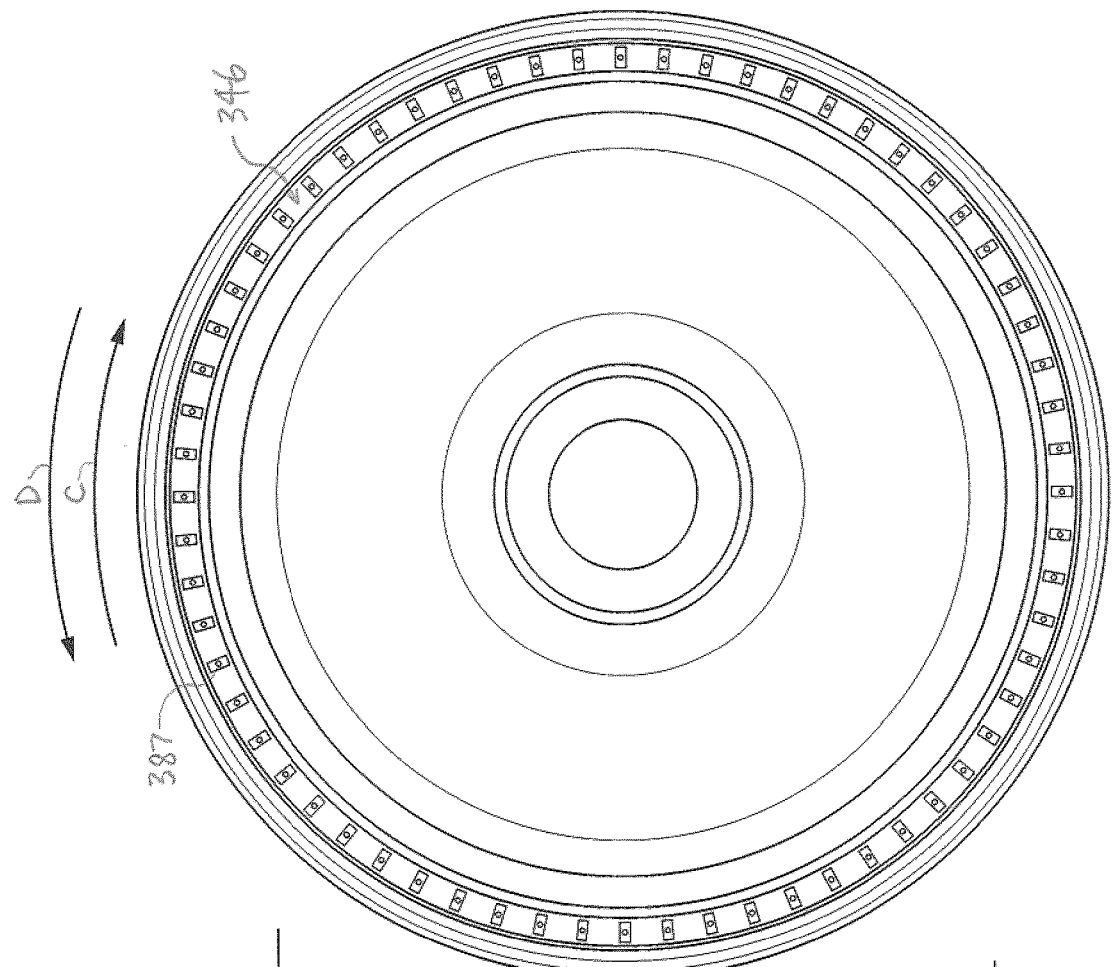
FIG. 5B is a side view of a repaired rail wheel, drawn at a smaller scale.
Figure 5A:
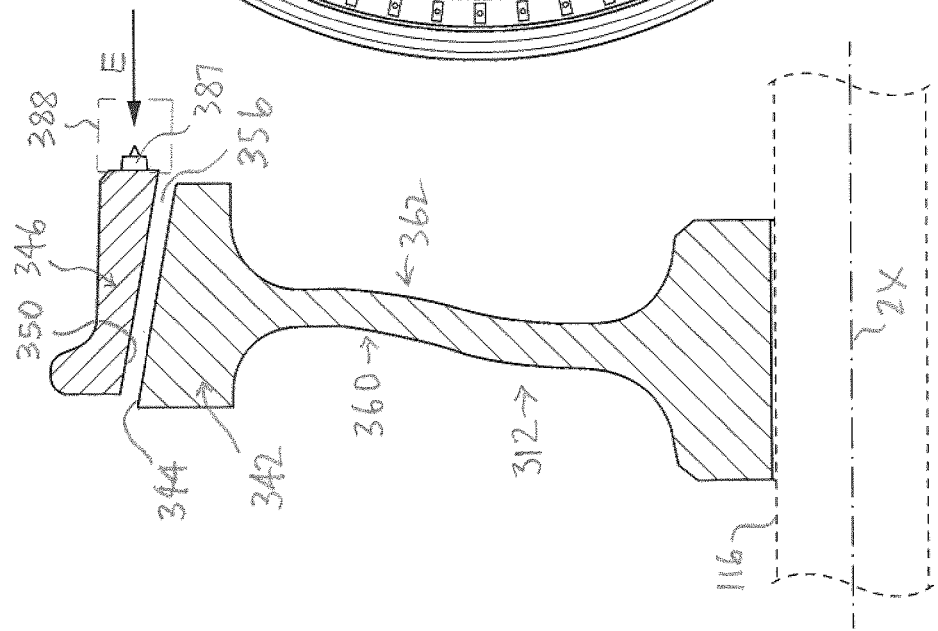
FIG. 5A is a cross-section of another alternative embodiment of the replacement workpiece of the invention located relative to a remaining segment of the rail wheel to define a predetermined gap therebetween, drawn at a smaller scale.

It will be understood that the first and second heated portions and the heating elements are omitted from FIGS. 5A and 5B for clarity of illustration.

In one embodiment, while the first engagement tool 388 is engaged with one or more of the first projections 387, the replacement workpiece 346 is urged thereby to rotate about the axis "2X" (FIGS. 5A, 5B).

It will be understood that a number of the engagement tools 388 may be respectively engaged with a number of the projections 387, simultaneously. Only one engagement tool 388 is shown, in FIG. 5A, to simplify the drawings.

As can be seen in FIGS. 5A and 5B, in one embodiment, a replacement workpiece 346 preferably includes one or more first teeth or projections 387 that may be engaged by the first tool 388 to cause the replacement workpiece 346 to be moved about the axis "2X" of the axle 116 (FIG. 5A) relative to the remaining portion 342 as the first and second engagement surfaces 344, 350 are engaged. Those skilled in the art would appreciate that the replacement workpiece 346 may be moved about the axis "2X" relative to the remaining portion 342 in clockwise or counterclockwise directions. The clockwise and counterclockwise directions of such movement are indicated by arrows "C" and "D" in FIG. 5B.

It will be understood that, as described above, one or more heating elements (not shown in FIG. 5A) are positioned in the predetermined gap 356. It will also be understood that, in the same manner as described above, the engagement surfaces 344, 350 are engaged after they have been heated to a hot working temperature in a non-oxidizing atmosphere. Movement of the replacement workpiece 346 relative to the remaining portion 342 during such engagement, by rotating the replacement workpiece 346 in one of the directions indicated by arrows "C" and "D", results in plastic deformation of at least parts of the engagement surfaces.

From the foregoing, it can be seen that the first tool 388 is mounted to the first teeth 387 by moving the first tool 388 in the direction generally indicated by arrow "E" in FIG. 5A. Preferably, the direction indicated by arrow "E" is substantially aligned with the axis "2X" of the axle 116. It will be understood that the rotation of the replacement workpiece 346 about the axis "2X" continues as the replacement workpiece 346 is pushed against the remaining portion 342, as indicated by arrow "E" in FIG. 5A. It will also be understood that, as illustrated in FIG. 5B, the replacement workpiece 346 is engaged with the remaining portion 342 of the rim 324. In FIG. 5A, the replacement workpiece 346 is shown as it is initially engaged with the remaining segment 342, i.e., before the replacement workpiece 346 is in its final position with respect to the remaining segment 342. The replacement workpiece 346, urged in the direction indicated by arrow "E", is urged from the outer side 362 of the wheel 312 toward the inner side 360. The outer side of the rail wheel 312 is shown in FIG. 5B.

After the replacement workpiece 346 is fused with the remaining portion 342 of the rim 324, the tool 388 and the first teeth 387 may be removed, in any suitable manner.

Figure 6B:
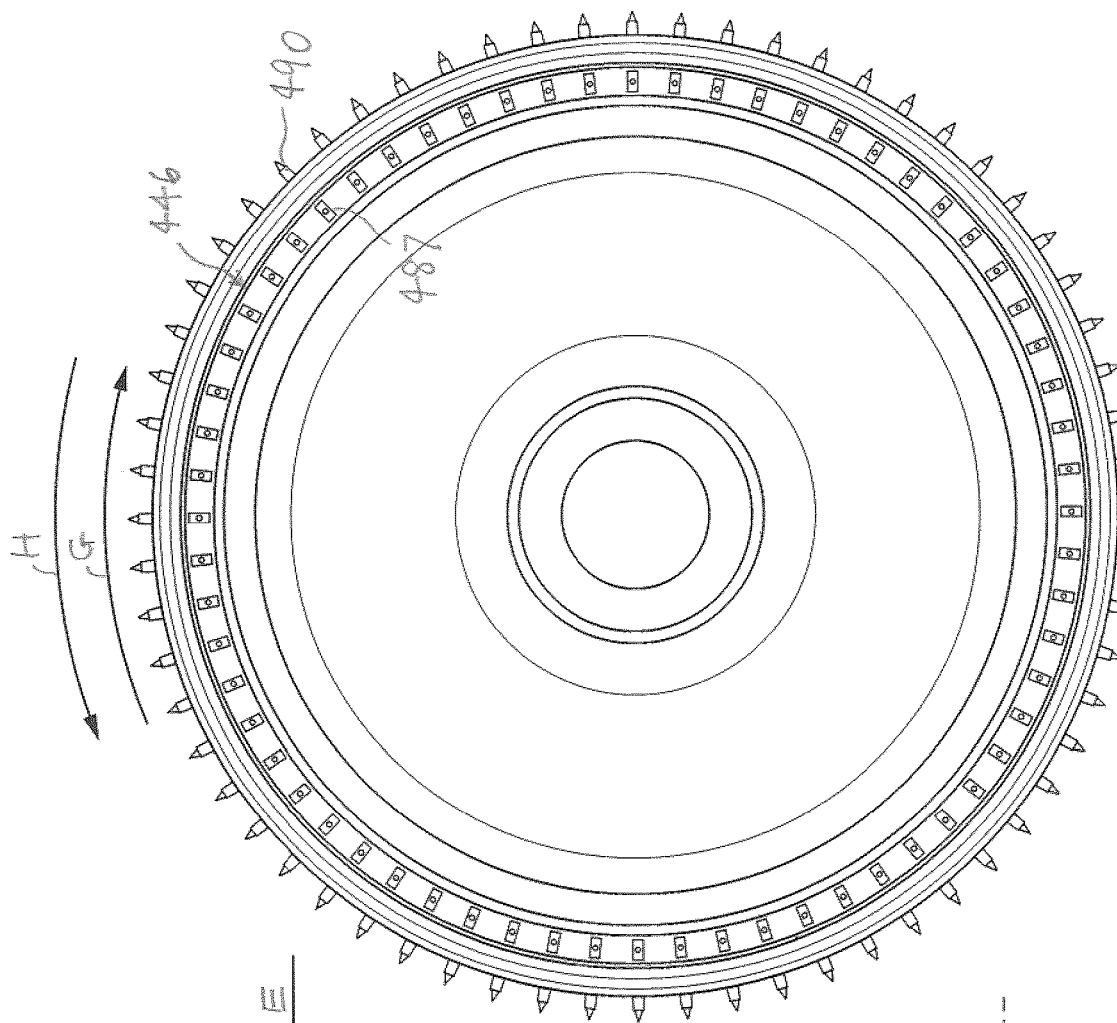
FIG. 6B is a side view of a repaired rail wheel, drawn at a smaller scale.
Figure 6A:
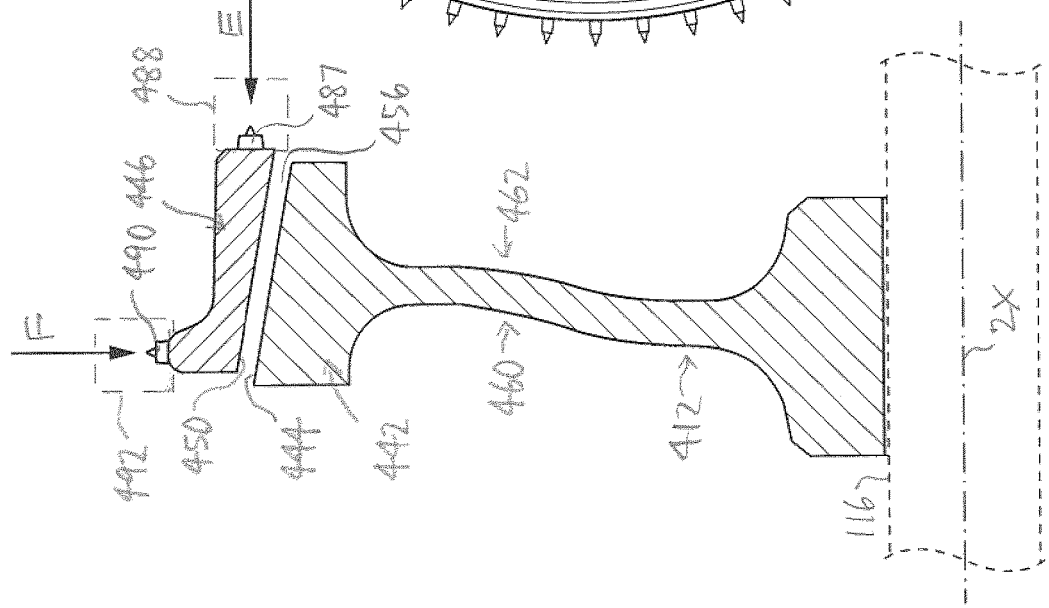
FIG. 6A is a cross-section of another alternative embodiment of the replacement workpiece of the invention located relative to a remaining segment of the rail wheel to define a predetermined gap therebetween, drawn at a larger scale.

Another alternative embodiment of the method of the invention is illustrated in FIGS. 6A and 6B. In this embodiment, the replacement workpiece 446 preferably includes one or more second teeth or projections 490, as well as first teeth or projections 487. A second tool 492 is engageable with the second teeth 490. To engage the second teeth 490, the second tool moves in the direction indicate by arrow "F" in FIG. 6A. Once so engaged, the second tool preferably moves the replacement workpiece 446 in either the clockwise or counterclockwise direction about the axis "2X" of the axle 116.

The first tool 488 is mounted to the first teeth 487 by moving the first tool 488 in the direction generally indicated by arrow "E" in FIG. 6A. It will be understood that the engagement of the first and second tools 488, 492 with the first and second teeth 487, 490 respectively may be substantially simultaneous. The first and second tools 488, 492 preferably work together to rotate the replacement workpiece 446 relative to the remaining segment 442 as the engagement surfaces 444, 450 are engaged together.

The movement of the replacement workpiece 446 about the axis "2X" in either clockwise or counterclockwise directions is indicated by the arrows "G" and "H" in FIG. 6B.

It will be understood that, as described above, one or more heating elements (not shown in FIG. 6A) are positioned in the predetermined gap 456. The engagement surfaces 444, 450 are engaged after they and the first and second heated portions (not shown) have been heated to a hot working temperature in a non-oxidizing atmosphere. Movement of the replacement workpiece 446 relative to the remaining portion 442 during such engagement, by rotating the replacement workpiece 346 in one of the directions indicated by arrows "G" and "H", results in plastic deformation of at least parts of the engagement surfaces.

In FIG. 6A, the replacement workpiece 446 is shown as it is initially engaged with the remaining segment 442, i.e., before the replacement workpiece 446 is in its final position with respect to the remaining segment 442. The replacement workpiece 446, urged in the direction indicated by arrow "E", is urged from the outer side 462 of the wheel 412 toward the inner side 460. The outer side of the rail wheel 412 is shown in FIG. 6B.

After the replacement workpiece 446 and the remaining portion 442 of the rim 424 are fused together, the tools 488, 492 and the first and second teeth 487,490 may be removed, by any suitable method.

As noted above, in one embodiment, the rail wheel to be repaired may remain mounted on the axle while the rail wheel is repaired. In this situation, as shown in FIGS. 5A and 6A, the engagement surfaces preferably are formed to define an acute angle relative to the axis "2X" that opens toward an inner side of the rail wheel. As shown in FIGS. 5A and 6A, the replacement workpiece is urged generally from the outer side of the rail wheel toward its inner side. However, as described above, in some situations it may be desirable to form the engagement surfaces so that they define an acute angle relative to the axis "2X" that opens toward an outer side of the rail wheel.

Figure 7:
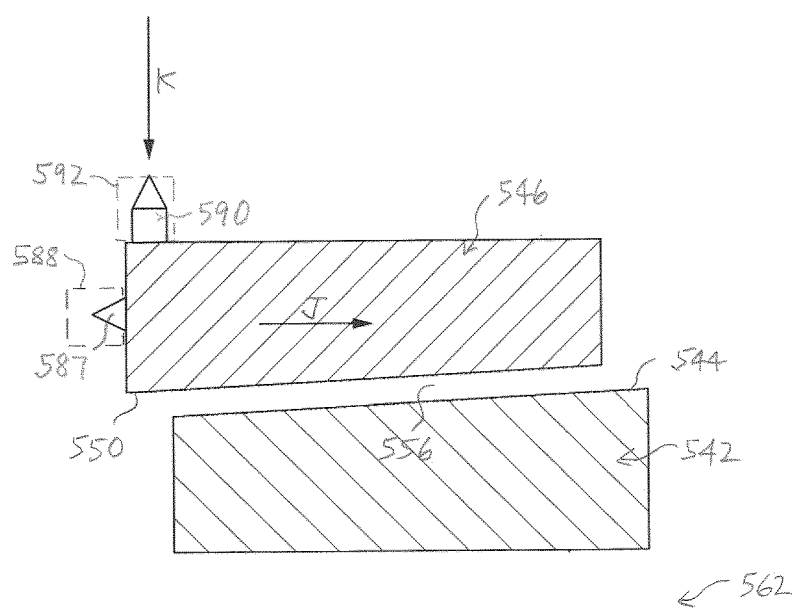
FIG. 7 is a schematic illustration showing positioning of the replacement workpiece relative to the remaining segment, drawn at a larger scale.

As illustrated in FIG. 7, when the engagement surfaces define an acute angle relative to the axis "2X" that opens toward an outer side 562 of the rail wheel, a replacement workpiece 546 may include first and second teeth 587, 590 that are formed to cooperate with first and second tools 588, 592, to cause the replacement workpiece 546 to move relative to a remaining portion 542 of the rim 524, as the engagement surfaces 544, 550 are engaged.

It will be understood that the engagement surfaces 544, 550 are heated by one or more heating elements (not shown) located in a predetermined gap 556 to a hot working temperature in a non-oxidizing atmosphere, at which point the heating elements are removed.

To mount the first tool 588 to the first teeth 587, the first tool is moved in the direction indicated by arrow "J" toward the first teeth 587 until engaged. To mount the second tool 592 to the second teeth 590, the second tool is moved in the direction generally indicated by arrow "K" in FIG. 7. The engagement of the first and second tools 588, 592 with the first and second teeth 587, 590 respectively may be substantially simultaneous.

Preferably, the replacement workpiece 546 is rotated about the axis "2X" by the first and second tools as the first tool pushes the replacement workpiece 546 in the direction generally indicated by arrow "J" in FIG. 7, to cause the second engagement surface 550 to move about the axis as the second engagement surface 550 engages with the first engagement surface 544.

As described above, after the engagement surfaces have been at least partially plastically deformed due to the rotation of the replacement workpiece 546 about the axis "2X" after the engagement of the engagement surfaces with each other, the replacement workpiece 546 and the remaining portion 542 are allowed to cool, to fuse together. The first and second teeth 587, 590 may thereafter be removed, by any suitable means.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A method of repairing a rail wheel having a rim including a worn body element and a worn tread and a worn flange thereon formed for engagement with a rail, the rail wheel including a boss defining an axis thereof in which an axle is receivable, and a web connecting the rim and the boss together, the method comprising:
   (a) removing a selected segment of the rim comprising the worn body element, the worn tread and the worn flange, to define a remaining segment of the rim having a remaining body element and a first engagement surface on the remaining body element, the first engagement surface being at least partially planar and positioned to define an acute angle relative to the axis, the acute angle having a vertex and defining an opening of the acute angle;
   (b) providing a replacement workpiece comprising a replacement body element having a second engagement surface thereon formed to mate with the first engagement surface, the replacement workpiece comprising a replacement tread and a replacement flange on the replacement body element positioned opposite to the second engagement surface;
   (c) positioning the replacement workpiece to locate the second engagement surface spaced apart from the first engagement surface by a predetermined distance, to define a predetermined gap between the first and second engagement surfaces;

(d) positioning at least one heating element in the predetermined gap, to heat respective first and second heated portions of the remaining body element and the replacement body element and the first and second engagement surfaces by induction heating, the first heated portion extending a first preselected distance from the first engagement surface into the remaining body element and the second heated portion extending a second preselected distance from the second engagement surface into the replacement body element;

(e) providing a non-oxidizing atmosphere covering the first and second engagement surfaces and the first and second heated portions;

(f) in the non-oxidizing atmosphere, with said at least one heating element, heating the first and second heated portions and the first and second engagement surfaces to a predetermined hot working temperature, the first and second heated portions and the first and second engagement surfaces being plastically deformable while at the hot working temperature;

(g) while the first and second heated portions are at the hot working temperature, and while at least one of the first and second engagement surfaces is moving relative to the other, engaging the first and second engagement surfaces together, and urging the replacement workpiece against the remaining segment in a direction away from the vertex and toward the opening, and against the remaining segment, to plastically deform the first and second engagement surfaces and at least parts of the first and second heated portions; and (h) allowing the first and second engagement surfaces and the first and second heated portions to cool, to bond the replacement workpiece and the remaining segment of the rim together.

2. The method according to claim 1 in which:

the remaining segment extends between inner and outer sides thereof proximal to inner and outer sides of the rail wheel respectively;

the first engagement surface extends between first inner and first outer ends thereof, adjacent to the inner and outer sides of the remaining segment respectively;

the remaining segment has a first external remaining segment radius defined between the first inner end of the first engagement surface and the axis, and a second external remaining segment radius defined between the first outer end of the first engagement surface and the axis;

the replacement workpiece extends between inner and outer sides thereof positionable proximal to the inner and outer sides of the rail wheel respectively;

the second engagement surface extends between second inner and second outer ends thereof, adjacent to the inner and outer sides of the replacement workpiece respectively;

the replacement workpiece has a first internal replacement workpiece radius defined between the second inner end of the second engagement surface and the axis, when the second engagement surface is engaged with the first engagement surface, and a second internal replacement workpiece radius defined between the second outer end of the second engagement surface and the axis, when the second engagement surface is engaged with the first engagement surface;

the first internal replacement workpiece radius is less than the first external remaining segment radius; and the second internal replacement workpiece radius is less than the second external remaining segment radius.

3. The method according to claim 1 in which the hot working temperature is approximately 1,265° C.

4. The method according to claim 1 in which the remaining segment and the replacement workpiece are made of dissimilar materials.

5. The method according to claim 1 in which the replacement workpiece is rotated about the axis while the first and second engagement surfaces and the first and second heated portions are at the hot working temperature and when the first and second engagement surfaces are engaged together.

6. A method of repairing a rail wheel having a rim including a worn body element and a worn tread and a worn flange thereon formed for engagement with a rail, the rail wheel including a boss defining an axis thereof in which an axle is receivable, and a web connecting the rim and the boss together, the rail wheel having an inner side to which the worn flange is proximal and an opposed outer side to which the worn flange is distal, the method comprising:

(a) removing a selected segment of the rim comprising the worn body element, the worn tread and the worn flange, to define a remaining segment of the rim having a remaining body element and a first engagement surface on the remaining body element, the first engagement surface being at least partially planar and positioned at least partially transverse to the axis;

(b) providing a replacement workpiece comprising a replacement body element having a second engagement surface thereon formed to mate with the first engagement surface, the replacement workpiece comprising a replacement tread and a replacement flange on the replacement body element and positioned opposite to the second engagement surface;

(c) positioning the replacement workpiece to locate the second engagement surface spaced apart from the first engagement surface by a predetermined distance to define a predetermined gap between the first and second engagement surfaces;

(d) positioning at least one heating element in the predetermined gap, to heat respective first and second heated portions of the remaining body element and the replacement body element by induction heating, the first heated portion extending a first preselected distance from the first engagement surface into the remaining body element and the second heated portion extending a second preselected distance from the second engagement surface into the replacement body element;

(e) providing a non-oxidizing atmosphere covering the first and second engagement surfaces and the first and second heated portions;

(f) in the non-oxidizing atmosphere, with said at least one heating element, heating the first and second heated portions and the first and second engagement surfaces to a predetermined hot working temperature, the first and second heated portions and the first and second engagement surfaces being plastically deformable while at the hot working temperature;

(g) while the first and second heated portions are at the hot working temperature, and while at least one of the first and second engagement surfaces is moving relative to the other, engaging the first and second engagement surfaces together, and urging the replacement workpiece against the remaining segment, to plastically deform the first and second engagement surfaces and at least parts of the first and second heated portions; and (h) allowing the first and second heated portions to cool, to bond the replacement workpiece and the remaining segment of the rim together.

7. The method according to claim 6 in which the first and second engagement surfaces are positioned to define a first acute angle relative to the axis, the first acute angle opening toward the inner side of the rail wheel.

8. The method according to claim 7 additionally comprising:
providing at least one first projection extending from an outer side of the replacement body element; and
with a first engagement tool, when the first and second heated portions and the first and second engagement surfaces are at the hot working temperature and when the first and second engagement surfaces are engaged together, engaging said at least one first projection, and urging the replacement workpiece toward the inner side of the rail wheel.

9. The method according to claim 8 additionally comprising:
providing at least one second projection mounted to the replacement flange and extending therefrom orthogonal to the axis; and
with a second engagement tool, when the first and second heated portions and the first and second engagement surfaces are at the hot working temperature and when the first and second engagement surfaces are engaged together, engaging said at least one second projection, and urging the replacement workpiece toward the inner side of the rail wheel.

10. The method according to claim 9 in which, while the second engagement tool is engaged with said at least one second projection, the replacement workpiece is urged thereby to rotate about the axis.

11. The method according to claim 8 in which, while the first engagement tool is engaged with said at least one first projection, the replacement workpiece is urged thereby to rotate about the axis.

12. The method according to claim 6 in which the first and second engagement surfaces are positioned to define a first acute angle having a first acute angle vertex that is located proximal to the outer side of the rail wheel.

13. The method according to claim 12 in which, when the first and second heated portions are at the hot working temperature, and when the first and second engagement surfaces are engaged together, the replacement workpiece is urged toward the inner side of the rail wheel.

14. The method according to claim 6 in which the first and second engagement surfaces are positioned to define a second acute angle vertex that is located proximal to the inner side of the rail wheel.

15. The method according to claim 14 in which, when the first and second heated portions are at the hot working temperature and when the first and second engagement surfaces are engaged together, the replacement workpiece is urged toward the outer side of the rail wheel.

16. The method according to claim 6 in which the first and second engagement surfaces are positioned to define a second acute angle relative to the axis, the second acute angle opening toward the outer side of the rail wheel.

* * * * *